US012361877B2

(12) United States Patent
Park et al.

(10) Patent No.: US 12,361,877 B2
(45) Date of Patent: Jul. 15, 2025

(54) DISPLAY DEVICE OPERATING IN VARIABLE REFRESH RATE BASED ON OPERATING FREQUENCY AND DRIVING METHOD

(71) Applicant: LG Display Co., Ltd., Seoul (KR)

(72) Inventors: Chan Park, Seoul (KR); Nakyoon Kim, Seoul (KR); Sojeong Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/395,832

(22) Filed: Dec. 26, 2023

(65) Prior Publication Data

US 2024/0221651 A1 Jul. 4, 2024

(30) Foreign Application Priority Data

Dec. 30, 2022 (KR) ........................ 10-2022-0191284

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0819* (2013.01); *G09G 2300/0861* (2013.01); *G09G 2310/061* (2013.01); *G09G 2320/0233* (2013.01); *G09G 2320/0247* (2013.01)

(58) Field of Classification Search
CPC .................................................... G09G 3/3233
USPC ............................................................ 345/76
See application file for complete search history.

(56) References Cited

U.S. PATENT DOCUMENTS

2022/0208075 A1* 6/2022 Kim ........................ G11C 19/28
2023/0140604 A1* 5/2023 Jeong ................... G09G 3/3266 345/211

FOREIGN PATENT DOCUMENTS

KR 102348668 B1 1/2022

* cited by examiner

*Primary Examiner* — Long D Pham
(74) *Attorney, Agent, or Firm* — Fish & Richardson P.C.

(57) ABSTRACT

Disclosed are a display device in which a scan timing for applying a stress voltage to a pixel is adjusted based on an operating frequency to prevent a flicker phenomenon even when the operating frequency varies, and a method for operating the same. The display device includes a display panel including a plurality of pixel circuits; and a gate driver circuit configured to provide an emission signal, a first scan signal, a second scan signal, a third scan signal, and a fourth scan signal to each of the plurality of pixel circuits, wherein when the display device operates in a variable refresh rate (VRR) mode, the display device is configured to adjust a time at and/or a time duration for which the third scan signal is enabled based on an operating frequency in each of a refresh frame and an anode reset frame, wherein the third scan signal is defined as a signal for applying an on-bias stress voltage to a pixel circuit.

21 Claims, 18 Drawing Sheets

| DBV(Band) | GIP |
|---|---|
| 1Band~7Band |  |
| 8~9Band |  |
| 10Band |  |
| 11Band |  |
| 12~13Band |  |

< 10Hz, Present embodiment >

DISPLAY DEVICE OPERATING IN VARIABLE REFRESH RATE BASED ON OPERATING FREQUENCY AND DRIVING METHOD

CROSS-REFERENCE TO RELATED APPLICATION

This application claims the priority of Korean Patent Application No. 10-2022-0191284 filed on Dec. 30, 2022, which is hereby incorporated by reference its entirety.

BACKGROUND

Field of the Disclosure

The present disclosure relates to a display device, and more particularly, to a display device capable of adjusting a scan timing to prevent a flicker phenomenon, and a method for operating the same.

Description of the Background

As the information society develops, demand for a display device for displaying an image is increasing in various forms. In this response, various display devices such as a liquid crystal display device and an organic light-emitting display device are being utilized.

The organic light-emitting display device does not require a separate light source and thus is in the limelight as means for vivid color display. The organic light-emitting display device uses an organic light-emitting diode as a self-light-emitting element, and thus has advantages such as fast response speed, high contrast ratio, high light-emitting efficiency, high luminance, and wide viewing angle.

SUMMARY

The display device has a VRR (Variable Refresh Rate) function that changes an operating frequency based on a type of an image to be displayed. Further, the display device has a function that adjusts a DBV (Display Bright Value) according to the user's setting.

However, in a display device according to the prior art, flicker characteristics may vary when the operating frequency and the DBV vary. Thus, a flicker phenomenon may occur when the operating frequency or the DBV varies. The inventors of the present disclosure have invented a display device capable of preventing the flicker phenomenon even when the DBV varies due to change in or setting of the operating frequency according to the VRR operation.

A technical purpose according to one aspect of the present disclosure is to provide a display device in which a scan timing for applying a stress voltage to a pixel is adjusted based on the operating frequency to prevent the flicker phenomenon even when the operating frequency varies, and to provide a method for operating the same.

Further, a technical purpose according to one aspect of the present disclosure is to provide a display device in which the scan timing is adjusted based on a luminance band to prevent a flicker phenomenon even when the DBV varies, and to a method for operating the same.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims or combinations thereof.

A display device according to one aspect of the present disclosure includes a display panel including a plurality of pixel circuits; and a gate driver circuit configured to provide an emission signal, a first scan signal, a second scan signal, a third scan signal, and a fourth scan signal to each of the plurality of pixel circuits, wherein when the display device operates in a variable refresh rate (VRR) mode, the display device is configured to adjust a time at and/or a time duration for which the third scan signal is enabled based on an operating frequency in each of a refresh frame and an anode reset frame, wherein the third scan signal is defined as a signal for applying an on-bias stress voltage to a pixel circuit.

A display device according to one aspect of the present disclosure includes a pixel circuit, wherein the pixel circuit includes: a light-emitting element configured to emit light based on a driving current; a driving transistor configured to control the driving current and including a gate electrode, a source electrode, and a drain electrode; a storage capacitor disposed between and connected to a power supply voltage and the gate electrode; a first transistor configured to connect the gate electrode and the drain electrode to each other in response to a first scan signal; a second transistor configured to apply a data voltage to the source electrode in response to a second scan signal; and a stress transistor configured to apply an on-bias stress voltage to the source electrode in response to a third scan signal, wherein when the display device operates in a VRR mode, the display device is configured to adjust a variation in a pulse width of the third scan signal and/or a shift of a toggle timing of the third scan signal based on an operating frequency in each of a refresh frame and an anode reset frame.

A method for operating a display device according to one aspect of the present disclosure is provided, wherein the display device includes: a display panel including a plurality of pixel circuits; and a gate driver circuit configured to provide an emission signal, a first scan signal, a second scan signal, a third scan signal, and a fourth scan signal to each of the plurality of pixel circuits, wherein the third scan signal is defined as a signal for applying an on-bias stress voltage to a pixel circuit, wherein the method comprises: when the display device operates in a variable refresh rate (VRR) mode, adjusting a time at and/or a time duration for which the third scan signal is enabled based on an operating frequency in each of a refresh frame and an anode reset frame.

According to the embodiments, the scan timing for applying the stress voltage to the pixel may be adjusted based on the operating frequency. Thus, the flicker phenomenon may be prevented even when the operating frequency is changed during the VRR operation.

Further, the scan timing may be adjusted based on the luminance band. Thus, the flicker may be prevented even when the DBV is changed.

Further, the display device may optimize the flicker characteristics by adjusting the scan timing based on the operating frequency and/or the DBV. Thus, the image quality may be improved.

Effects of the present disclosure are not limited to the effects mentioned above, and other effects not mentioned will be clearly understood by those skilled in the art from the description below.

In addition to the above effects, specific effects of the present disclosure are described together while describing specific details for carrying out the present disclosure.

DETAILED DESCRIPTION

Figure 1:
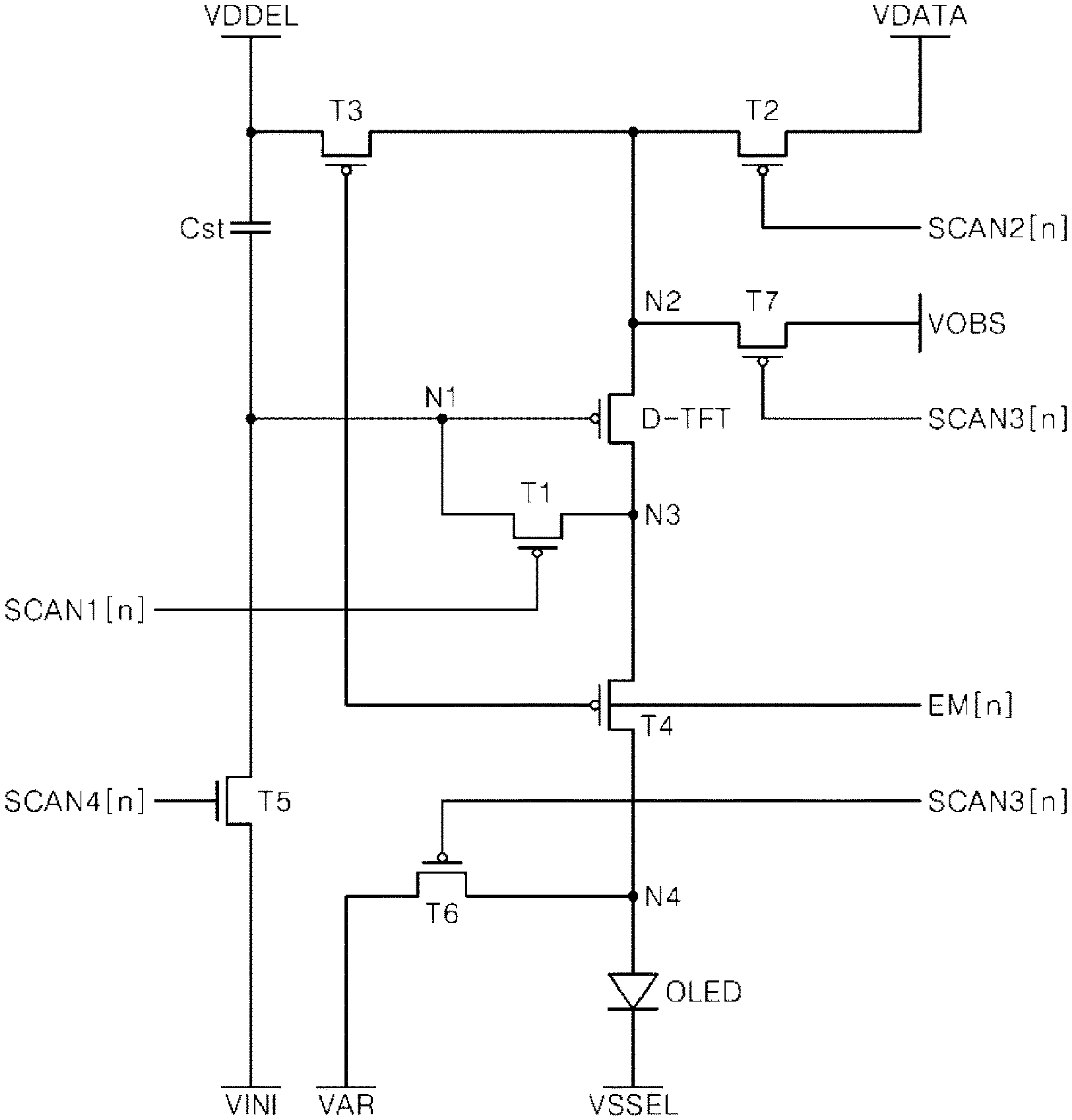
FIG. 1 shows a pixel circuit of a display device according to one aspect.

Advantages and features of the present disclosure, and a method of achieving the advantages and features will become apparent with reference to embodiments described later in detail together with the accompanying drawings. However, the present disclosure is not limited to the embodiments as disclosed under, but may be implemented in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "including", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event may occur therebetween unless "directly after", "directly subsequent" or "directly before" is not indicated.

When a certain aspect may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described under could be termed a second element, component, region, layer or section, without departing from the spirit and scope of the present disclosure.

The features of the various embodiments of the present disclosure may be partially or entirely combined with each other, and may be technically associated with each other or operate with each other. The embodiments may be implemented independently of each other and may be implemented together in an association relationship.

In interpreting a numerical value, the value is interpreted as including an error range unless there is no separate explicit description thereof.

It will be understood that when an element or layer is referred to as being "connected to", or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

The features of the various embodiments of the present disclosure may be partially or entirely combined with each other, and may be technically associated with each other or operate with each other. The embodiments may be implemented independently of each other and may be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "embodiments," "examples," "aspects," and the like should not be construed such that any aspect or design as described is superior to or advantageous over other aspects or designs.

Further, the term 'or' means 'inclusive or' rather than 'exclusive or'. That is, unless otherwise stated or clear from the context, the expression that 'x uses a or b' means any one of natural inclusive permutations.

The terms used in the description below have been selected as being general and universal in the related technical field. However, there may be other terms than the terms depending on the development and/or change of technology, convention, preference of technicians, etc. Therefore, the terms used in the description below should not be understood as limiting technical ideas, but should be understood as examples of the terms for illustrating embodiments.

Further, in a specific case, a term may be arbitrarily selected by the applicant, and in this case, the detailed meaning thereof will be described in a corresponding description section. Therefore, the terms used in the description below should be understood based on not simply the name of the terms, but the meaning of the terms and the contents throughout the Detailed Descriptions.

In description of flow of a signal, for example, when a signal is delivered from a node A to a node B, this may include a case where the signal is transferred from the node A to the node B via another node unless a phrase 'immediately transferred' or 'directly transferred' is used.

Hereinafter, a display device according to some embodiments and a method for operating the same will be described. Prior to describing the embodiments, the meaning of terms used in the present disclosure is defined.

As used herein, a frame may be a concept of a temporal period. In some cases, the frame may have meanings such as an image or an operation mode.

As used herein, a refresh frame may be defined as a period for refreshing an image of a display panel. In one example, the refresh frame may include an initialization period, a sampling period, and a stress period.

As used herein, a refresh skip frame may be defined as a period for maintaining the image of the display panel. In one example, the refresh skip frame may include a stress period.

As used herein, an anode reset frame may be defined as a period for initializing a specific node of a pixel circuit. In one example, in the anode reset frame, an initialization voltage may be applied to an anode electrode of a light-emitting element, and an on-bias stress voltage may be applied to a source electrode of a driving transistor.

FIG. 1 is a circuit diagram showing a pixel circuit of a display device according to an aspect.

Referring to FIG. 1, the pixel circuit may include a light-emitting element OLED, a driving transistor D-TFT, a first transistor T1, a storage capacitor Cst, a second transistor T2, a third transistor T3, a fourth transistor T4, a fifth transistor T5, a sixth transistor T6 and a seventh transistor T7.

The light-emitting element OLED emits light based on a driving current. The light-emitting element OLED is embodied as an organic light-emitting diode, and is composed of an anode electrode, a cathode electrode, and an organic light-emissive layer between the anode electrode and the cathode electrode.

The driving transistor D-TFT controls the driving current, and includes a gate electrode, a source electrode and a drain electrode. A data voltage VDATA is applied to the source electrode of the driving transistor D-TFT, while the anode electrode of the light-emitting element OLED is connected to the drain electrode of the driving transistor D-TFT.

The storage capacitor Cst is connected to and disposed between a high-potential voltage VDDEL and the gate electrode of the driving transistor D-TFT. Further, the storage capacitor Cst is connected to and disposed between the high-potential voltage VDDEL and the fifth transistor T5.

The first transistor T1 is connected to and disposed between the gate electrode and the drain electrode of the driving transistor D-TFT. Further, the first transistor T1 is connected to and disposed between the storage capacitor Cst and the drain electrode of the driving transistor D-TFT. The first transistor T1 connects the gate electrode and the drain electrode of the driving transistor D-TFT to each other in response to a first scan signal SCAN1[*n*], and connects the storage capacitor Cst and the drain electrode of the driving transistor D-TFT to each other in response to the first scan signal SCAN1[*n*].

The second transistor T2 is connected to and disposed between the data voltage VDATA and the source electrode of the driving transistor D-TFT. Further, the second transistor T2 is connected to and disposed between the data voltage VDATA and the third transistor T3. The second transistor T2 applies the data voltage VDATA to the source electrode of the driving transistor D-TFT in response to a second scan signal SCAN2[*n*].

The third transistor T3 is connected to and disposed between the high-potential voltage VDDEL and the source electrode of the driving transistor D-TFT. The third transistor T3 applies the high-potential voltage VDDEL to the source electrode of the driving transistor D-TFT in response to an emission signal Em[n].

The fourth transistor T4 is connected to and disposed between the drain electrode of the driving transistor D-TFT and the anode electrode of the light-emitting element OLED. The fourth transistor T4 generates a current path between the driving transistor D-TFT and the light-emitting element OLED in response to the emission signal Em[n]. Luminance or gradation of the light-emitting element OLED is determined based on a current intensity of the current path. The current intensity of the current path is determined based on the data voltage VDATA corresponding to the image data.

The fifth transistor T5 is connected to and disposed between the gate electrode of the driving transistor D-TFT and a first initialization voltage VINI. Further, the fifth transistor T5 is connected to and disposed between the storage capacitor Cst and the first initialization voltage VINI. The fifth transistor T5 applies the first initialization voltage VINI to the gate electrode of the driving transistor D-TFT and one electrode of the storage capacitor Cst in response to a fourth scan signal SCAN4[*n*] such that the gate electrode of the driving transistor D-TFT and one electrode of the storage capacitor Cst are initialized with the first initialization voltage VINI.

The storage capacitor Cst has one electrode connected to the high-potential voltage VDDEL and the third transistor T3 and the other electrode connected to the gate electrode of the driving transistor D-TFT and the fifth transistor T5. The storage capacitor Cst samples the data voltage VDATA according to operation of the second transistor T2, the driving transistor D-TFT, and the first transistor T1, and is initialized with the first initialization voltage VINI according to operation of the fifth transistor T5.

The sixth transistor T6 is connected to and disposed between the anode electrode of the light-emitting element OLED and a second initialization voltage VAR. The sixth transistor T6 applies the second initialization voltage VAR to the anode electrode of the light-emitting element OLED in response to a third scan signal SCAN3[*n*]. As used herein, the sixth transistor T6 may be referred to as a reset transistor.

The seventh transistor T7 is connected to and disposed between the source electrode of the driving transistor D-TFT and an on-bias stress voltage VOBS. The seventh transistor T7 applies the on-bias stress voltage VOBS to the source electrode of the driving transistor D-TFT in response to the third scan signal SCAN3[*n*].

The sixth transistor T6 and the seventh transistor T7 respectively apply the second initialization voltage VAR to the anode of the light-emitting element OLED and the on-bias stress voltage VOBS to the source electrode of the driving transistor D-TFT in response to the third scan signal SCAN3[*n*] enabled in an initialization period and a stress period of a refresh frame, and an anode reset frame.

In the present embodiments, at least one of a pulse width and a toggle timing of the third scan signal SCAN3[*n*] is adjusted based on an operating frequency and a luminance band to prevent a flicker phenomenon even when the operating frequency or the DBV is changed according to the VRR operation.

In one example, the first scan signal SCAN1[*n*], the second scan signal SCAN2[*n*], the third scan signal SCAN3[*n*] and the emission signal Em[n] may be generated from at least one gate driver and may be provided to each of pixel circuits of the display panel.

Figure 2:
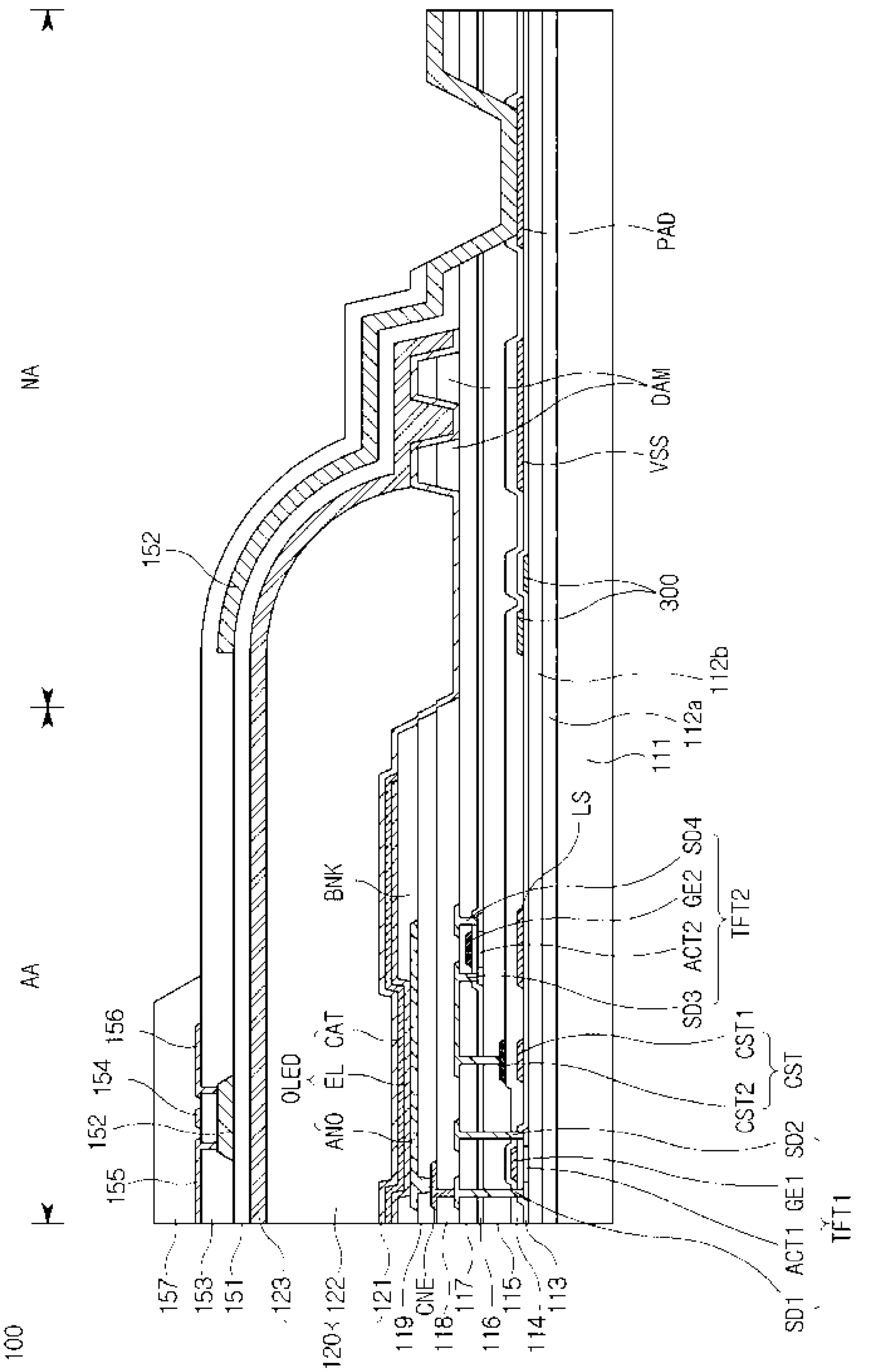
FIG. 2 is a cross-sectional view showing a stacked structure of a display device according to one aspect.

FIG. 2 is a cross-sectional view showing a stack structure of a display device according to one aspect.

Referring to FIG. 2, FIG. 2 is a cross-sectional view the display device including two switching thin-film transistors TFT1 and TFT2 and one capacitor CST. The two thin-film transistors TFT1 and TFT2 include one TFT1 of a switching thin-film transistor or a driving transistor including a polycrystalline semiconductor material, and an oxide thin-film transistor TFT2 including an oxide semiconductor material. In this case, the thin-film transistor including the polycrystalline semiconductor material is referred to as a polycrystalline thin-film transistor TFT1, while the thin-film transistor including the oxide semiconductor material is referred to as the oxide thin-film transistor TFT2.

The polycrystalline thin-film transistor TFT1 shown in FIG. 2 is an emission switching thin-film transistor connected to a light-emitting element OLED, and the oxide thin-film transistor TFT2 as shown in FIG. 2 is one switching thin-film transistor connected to a capacitor CST.

One pixel P includes the light-emitting element OLED and a pixel driver circuit that applies a driving current to the light-emitting element OLED. The pixel driver circuit is disposed on a substrate 111, and the light-emitting element OLED is disposed on the pixel driver circuit. Further, an encapsulation layer 120 is disposed on the light-emitting element OLED. The encapsulation layer 120 protects the light-emitting element OLED.

The pixel driver circuit may refer to one pixel P array including a driving thin-film transistor, a switching thin-film transistor, and a capacitor. Further, the light-emitting element OLED may refer to an array for light emission including an anode electrode, a cathode electrode, and a light-emitting layer disposed therebetween.

In one aspect, each of the driving thin-film transistor and at least one switching thin-film transistor uses an oxide semiconductor as a material of an active layer thereof. A thin-film transistor using an oxide semiconductor material as an active layer has excellent leakage current blocking effect and has a relatively lower manufacture cost than that of a thin-film transistor using a polycrystalline semiconductor material as an active layer. Therefore, to reduce power consumption and the manufacturing cost, the pixel driver circuit according to one aspect includes the driving thin-film transistor using an oxide semiconductor material and the at least one switching thin-film transistor using an oxide semiconductor material.

All of the thin-film transistors constituting the pixel driver circuit may be implemented using the oxide semiconductor material, or only some of switching thin-film transistors may be implemented using the oxide semiconductor material.

However, it is difficult for a thin-film transistor using an oxide semiconductor material to secure reliability, and a thin-film transistor using a polycrystalline semiconductor material has a high operating speed and excellent reliability. Thus, in one aspect, the pixel driver circuit includes both a switching thin-film transistor using the oxide semiconductor material and a switching thin-film transistor using the polycrystalline semiconductor material.

The substrate 111 may be implemented as a multi-layer in which organic and inorganic films are alternately stacked on top of each other. For example, the substrate 111 may be formed by alternately stacking organic films made of polyimide and inorganic films made of silicon oxide ($SiO_2$) on top of each other.

A lower buffer layer 112*a* is formed on the substrate 111. The lower buffer layer 112*a* is intended to block moisture that is originated from an outside, and may be formed by stacking silicon oxide ($SiO_2$) films in multiple layers. An auxiliary buffer layer 112*b* may be further disposed on the lower buffer layer 112*a* to protect an element from moisture.

On the substrate 111, a polycrystalline thin-film transistor TFT1 is formed. The polycrystalline thin-film transistor TFT1 may use a polycrystalline semiconductor as a material of an active layer. The polycrystalline thin-film transistor TFT1 includes a first active layer ACT1 including a channel along which electrons or holes migrate, a first gate electrode GE1, a first source electrode SD1, and a first drain electrode SD2.

The first active layer ACT1 includes a first channel area, a first source area disposed on one side of the first channel area, and a first drain area disposed on the other side thereof while the first channel area is interposed therebetween.

Each of the first source area and the first drain area is a conductive area in which an intrinsic polycrystalline semiconductor material is doped with Group V or Group III impurities, for example, phosphorus (P) or boron (B) at a predetermined concentration. The first channel area is an area in which a polycrystalline semiconductor material maintains its intrinsic state and provides a path in which electrons or holes migrate.

In one example, the polycrystalline thin-film transistor TFT1 includes the first gate electrode GE1 overlapping the first channel area of the first active layer ACT1. A first gate insulating layer 113 is disposed between the first gate electrode GE1 and the first active layer ACT1. The first gate insulating layer 113 may be composed of a single layer or a stack of multilayers made of an inorganic material such as silicon oxide ($SiO_2$) or silicon nitride ($SiN_x$).

In one aspect, the polycrystalline thin-film transistor TFT1 has a top gate structure in which the first gate electrode GE1 is positioned on top of the first active layer ACT1. Accordingly, a first electrode CST1 included in the capacitor CST and a light-blocking layer LS included in the oxide thin-film transistor TFT2 may be made of the same material as that of the first gate electrode GE1. A mask process may be reduced by forming the first gate electrode GE1, the first electrode CST1, and the light-blocking layer LS in a single mask process.

The first gate electrode GE1 is made of a metal material. For example, the first gate electrode GE1 may be embodied as a single layer or a stack of multiple layers made of one of molybdenum (Mo), aluminum (Al), chromium (Cr), gold (Au), titanium (Ti), nickel (Ni), neodymium (Nd), or copper (Cu), or alloys thereof. However, the present disclosure is not limited thereto.

A first interlayer insulating layer 114 is disposed on the first gate electrode GE1. The first interlayer insulating layer 114 may be made of silicon oxide ($SiO_2$), silicon nitride ($SiN_x$), or the like.

The display panel 100 may further include an upper buffer layer 115, a second gate insulating layer 116, and a second interlayer insulating layer 117 sequentially stacked on the first interlayer insulating layer 114. The polycrystalline thin-film transistor TFT1 includes a first source electrode SD1 and a first drain electrode SD2 formed on the second interlayer insulating layer 117 and connected to the first source area and the first drain area, respectively.

Each of the first source electrode SD1 and the first drain electrode SD2 may be embodied as a single layer or a stack of multiple layers made of one of molybdenum (Mo), aluminum (Al), chromium (Cr), gold (Au), titanium (Ti), nickel (Ni), neodymium (Nd), or copper (Cu), or alloys thereof. However, the present disclosure is not limited thereto.

The upper buffer layer 115 spaces a second active layer ACT2 of the oxide thin-film transistor TFT2 made of an oxide semiconductor material from the first active layer ACT1 of the polycrystalline thin-film transistor TFT1 made of the polycrystalline semiconductor material, and provides a base for forming the second active layer ACT2.

The second gate insulating layer 116 covers the second active layer ACT2 of the oxide thin-film transistor TFT2. Since the second gate insulating layer 116 is formed on the second active layer ACT2 made of the oxide semiconductor material, the second gate insulating layer 116 is embodied as an inorganic film. For example, the second gate insulating layer 116 may be made of silicon oxide ($SiO_2$) or silicon nitride ($SiN_x$).

A second gate electrode GE2 is made of a metal material. For example, the second gate electrode GE2 may be embodied as a single layer or a stack of multiple layers made of one of molybdenum (Mo), aluminum (Al), chromium (Cr), gold (Au), titanium (Ti), nickel (Ni), neodymium (Nd), or copper (Cu), or alloys thereof. However, the present disclosure is not limited thereto.

In one example, the oxide thin-film transistor TFT2 includes the second active layer ACT2 formed on the upper buffer layer 115 and made of the oxide semiconductor material, the second gate electrode GE2 disposed on the second gate insulating layer 116, and a second source electrode SD3 and a second drain electrode SD4 disposed on the second interlayer insulating layer 117.

The second active layer ACT2 is made of the oxide semiconductor material and includes a second channel area which is non-doped with impurities and thus is intrinsic, and a second source area and a second drain area which are doped with impurities and thus are conductive.

The oxide thin-film transistor TFT2 further includes the light-blocking layer LS positioned under the upper buffer layer 115 and overlapping with the second active layer ACT2. The light-blocking layer LS prevents light from being incident on the active layer 401 to ensure reliability of the oxide thin-film transistor TFT2. The light-blocking layer LS is made of the same material as that of the first gate electrode GE1 and may be formed on an upper surface of the first gate insulating layer 113. The light-blocking layer LS may be electrically connected to the second gate electrode GE2 to constitute a dual gate.

The second source electrode SD3 and the second drain electrode SD4, and the first source electrode SD1 and the first drain electrode SD2 may be formed on the second interlayer insulating layer 117 in the same process and may be made of the same material. Thus, the number of mask processes may be reduced.

In one example, the capacitor CST may be implemented by disposing a second electrode CST2 on the first interlayer insulating layer 114 to overlap with the first electrode CST1. The second electrode CST2 may be embodied as a single layer or a stack of multiple layers made of one of molybdenum (Mo), aluminum (Al), chromium (Cr), gold (Au), titanium (Ti), nickel (Ni), neodymium (Nd), or copper (Cu), or alloys thereof. However, the present disclosure is not limited thereto.

The capacitor CST stores therein the data voltage applied via the data line DL for a certain time duration and provides the same to the light-emitting element OLED. The capacitor CST includes two electrodes facing each other and a dielectric layer disposed therebetween. The first interlayer insulating layer 114 as the dielectric layer is positioned between the first electrode CST1 and the second electrode CST2 to constitute the capacitor CST.

The first electrode CST1 or the second electrode CST2 of the capacitor CST may be electrically connected to the second source electrode SD3 or the second drain electrode SD4 of the oxide thin-film transistor TFT2. However, the present disclosure is not limited thereto. A connection relationship of the capacitor CST may vary based on a structure of the pixel driver circuit.

In one example, a first planarization layer 118 and a second planarization layer 119 are sequentially disposed on the pixel driver circuit to planarize a top surface of a structure on top of the pixel driver circuit. Each of the first planarization layer 118 and the second planarization layer 119 may be embodied as an organic film made of, for example, polyimide or acrylic resin.

The light-emitting element OLED is formed on the second planarization layer 119. The light-emitting element OLED includes an anode electrode ANO, a cathode electrode CAT, and a light-emitting layer EL disposed between the anode electrode ANO and the cathode electrode CAT. When the pixel driver circuits are implemented to commonly use a low-potential voltage connected to the cathode electrode CAT, the anode electrode ANO may be embodied as a separate electrode in each sub-pixel. When the pixel driver circuits are implemented to commonly use a high-potential voltage, the cathode electrode CAT may be embodied as a separate electrode in each sub-pixel.

The light-emitting element OLED is electrically connected to a driving element via an intermediate electrode CNE disposed on the first planarization layer 118. Specifically, the anode electrode ANO of the light-emitting element OLED and the first source electrode SD1 of the polycrystalline thin-film transistor TFT1 constituting the pixel driver circuit are connected to each other via the intermediate electrode CNE.

The anode electrode ANO is connected to a portion of the intermediate electrode CNE exposed through a contact-hole extending through the second planarization layer 119. Further, the intermediate electrode CNE is connected to a portion of the first source electrode SD1 exposed through a contact-hole extending through the first planarization layer 118.

The intermediate electrode CNE serves to connect the first source electrode SD1 and the anode electrode ANO to each other. The intermediate electrode CNE may be made of a conductive material such as copper (Cu), silver (Ag), molybdenum (Mo), and titanium (Ti).

The anode electrode ANO may be formed in a multilayer structure including a transparent conductive film and an opaque conductive film with high reflection efficiency. The transparent conductive film may be made of a material with a relatively high work function value such as indium-tin-oxide (ITO) or indium-zinc-oxide (IZO). The opaque conductive film may be embodied as a single layer or a stack of multiple layers made of one of aluminum (Al), copper (Cu), silver (Ag), lead (Pb), molybdenum (Mo), titanium (Ti) or alloys thereof. For example, the anode electrode ANO may be made of a structure in which a transparent conductive film, an opaque conductive film, and a transparent conductive film are sequentially stacked, or a structure in which a transparent conductive film and an opaque conductive film are sequentially stacked.

The light-emitting layer EL is formed by stacking a hole-related layer, an organic light-emitting layer, and an electron-related layer in the order or reverse order on the anode electrode ANO. The bank layer BNK may be a pixel definition layer not covering the anode electrode ANO of each pixel P to be exposed. The bank layer BNK may be made of an opaque material (for example, a black material) to prevent light interference between adjacent pixels P. In this case, the bank layer BNK includes a light-shielding material made of at least one of color pigment, organic black, and carbon. A spacer 700 may be further disposed on the bank layer BNK.

The cathode electrode CAT faces the anode electrode ANO while the light-emitting layer EL is interposed therebetween. The cathode electrode CAT is formed on the upper and side surfaces of the light-emitting layer EL. The cathode electrode CAT may be integrally formed and may be disposed over an entirety of the display area AA. When the cathode electrode CAT is applied to a top emission type organic light-emitting display device, the cathode electrode CAT may be made of a transparent conductive film such as indium-tin-oxide (ITO) or indium-zinc-oxide (IZO).

On the cathode electrode CAT, an encapsulation layer 120 for suppressing moisture permeation may be further disposed.

The encapsulation layer 120 may prevent external moisture or oxygen from invading the light-emitting element OLED that is vulnerable to the external moisture or oxygen. To this end, the encapsulation layer 120 may include at least one inorganic encapsulation layer and at least one organic encapsulation layer. However, the present disclosure is not limited thereto. In the present disclosure, an example in which the encapsulation layer 120 has a structure in which a first encapsulation layer 121, a second encapsulation layer 122, and a third encapsulation layer 123 are sequentially stacked will be described.

The first encapsulation layer 121 is formed on the substrate 111 on which the cathode electrode CAT has been formed. The third encapsulation layer 123 may be formed on the substrate 111 on which the second encapsulation layer 122 has been formed. The third encapsulation layer 123 together with the first encapsulation layer 121 may surround an upper surface, a lower surface, and a side surface of the second encapsulation layer 122. Each of the first encapsulation layer 121 and the third encapsulation layer 123 may minimize or prevent penetration of external moisture or oxygen into the light-emitting element OLED. Each of the first encapsulation layer 121 and the third encapsulation layer 123 may be made of an inorganic insulating material which may be deposited at low-temperature, such as silicon nitride ($SiN_x$), silicon oxide (SiOx), silicon oxynitride (SiON), or aluminum oxide ($Al_2O_3$). Since the first encapsulation layer 121 and the third encapsulation layer 123 may be deposited in a low temperature atmosphere, the light-emitting element OLED which is vulnerable to a high-temperature atmosphere may be prevented from being damaged during the deposition process of the first encapsulation layer 121 and the third encapsulation layer 123.

The second encapsulation layer 122 may serve to relieve stress applied to each layer as the display device 10 is bent, and may planarize a step formed between the layers. The second encapsulation layer 122 may be formed on the substrate 111 on which the first encapsulation layer 121 has been formed, and may be made of a non-photosensitive organic insulating material such as acryl resin, epoxy resin, phenolic resin, polyamide resin, polyimide resin, polyethylene or silicon oxycarbon (SiOC) or a photosensitive organic insulating material such as photoacryl. However, the present disclosure is not limited thereto. When the second encapsulation layer 122 is formed in an inkjet scheme, a dam DAM may be disposed to prevent a material of the second encapsulation layer 122 in a liquid state from spreading to an edge of the substrate 111. The dam DAM may be disposed closer to the edge of the substrate 111 than the second encapsulation layer 122 may be. The dam DAM may prevent the material of the second encapsulation layer 122 from spreading to a pad area where a conductive pad disposed on an outermost position of the substrate 111 is disposed.

The dam DAM is designed to prevent the diffusion of the second encapsulation layer 122. However, when a top level of the second encapsulation layer 122 is formed to be higher that a top level of the dam DAM during a process, the second encapsulation layer 122 as an organic layer may be partially exposed to an outside, and thus the moisture or the like may easily invade the light-emitting element. Therefore, to prevent this situation, at least 10 or more dams DAM may be arranged in a sequential manner.

The dam DAM may be disposed on the second interlayer insulating layer 117 and in the non-display area NA.

Further, the dam DAM may be formed simultaneously with the first planarization layer 118 and the second planarization layer 119. The first planarization layer 118 and a lower layer of the dam DAM may be formed in the same process. The second planarization layer 119 and an upper layer of dam DAM may be formed in the same process. Thus, the dam may have a double stack structure.

Therefore, the dam DAM may be made of the same material as that of each of the first planarization layer 118 and the second planarization layer 119. However, the present disclosure is not limited thereto.

The dam DAM may be disposed to overlap a low-potential driving power line VSS. For example, in the non-display area NA, the low-potential driving power line VSS may be disposed under the dam DAM to overlap the dam.

The low-potential driving power line VSS and the gate driver 300 configured in a form of a GIP (Gate In Panel) may be formed to surround a periphery of the display panel. The low-potential driving power line VSS may be positioned outwardly of the gate driver 300. Further, the low-potential driving power line VSS may be connected to the cathode electrode CAT and may apply a common voltage thereto. The gate driver 300 is denoted as a block in the plan and cross-sectional views. However, the gate driver may be composed of a thin-film transistor having the same structure as that of the thin-film transistor of the display area AA.

The low-potential driving power line VSS is disposed outwardly of the gate driver 300. The low-potential driving power line VSS is disposed outwardly of the gate driver 300 and surrounds the display area AA. For example, the low-potential driving power line VSS may be made of the same material as that of the first gate electrode GE1. However, the present disclosure is not limited thereto, and the low-potential driving power line VSS may be made of the same material as that of the second electrode CST2 or the first source and drain electrodes SD1 and SD2. However, the present disclosure is not limited thereto.

Further, the low-potential driving power line VSS may be electrically connected to the cathode electrode CAT. The low-potential driving power line VSS may supply a low-potential driving voltage EVSS to the plurality of pixels P of the display area AA.

A touch layer may be disposed on the encapsulation layer 120. The touch layer may include a touch buffer film 151 positioned between a touch sensor metal including touch electrode connection lines 152 and 154 and touch electrodes 155 and 156 and the cathode electrode CAT of the light-emitting element OLED.

The touch buffer film 151 may prevent chemicals (developer or etchant) used in a manufacturing process of the touch sensor metal disposed on the touch buffer film 151 or moisture from the outside from invading the light-emitting layer EL including the organic material. Accordingly, the touch buffer film 151 may prevent damage to the light-emitting layer EL which is vulnerable to the chemicals or moisture.

The touch buffer film 151 may be made of an organic insulating material that may be formed at a low temperature lower than a certain temperature (100 degrees C.) to prevent the damage to the light-emitting layer EL including the organic material vulnerable to high temperature, and has a low dielectric constant of 1 to 3. For example, the touch buffer film 151 may be made of an acryl-based, epoxy-based, or siloxane-based material. The touch buffer film 151 made of an organic insulating material and has a planarization performance may prevent damage to the encapsulation layer 120 and prevent the touch sensor metal formed on the touch buffer film 151 from breaking as the organic light-emitting display device is bent.

According to a mutual-capacitance-based touch sensor structure, the touch electrodes 155 and 156 may be disposed on the touch buffer layer 151, and the touch electrodes 155 and 156 may intersect each other.

The touch electrode connection lines 152 and 154 may electrically connect the touch electrodes 155 and 156 to each other. The touch electrode connection lines 152 and 154 and the touch electrodes 155 and 156 may be positioned at different layers while the touch insulating film 153 is interposed therebetween.

The touch electrode connection lines 152 and 154 may overlap the bank layer BNK, so that an aperture ratio may be prevented from being lowered.

In one example, a portion of the touch electrode connection line 152 may extend along upper and side surfaces of the encapsulation layer 120 and upper and side surfaces of the dam DAM and then may be electrically connected to a touch driver circuit (not shown) via a touch pad PAD. Thus, the touch electrodes 155 and 156 may be electrically connected to the touch driver circuit.

The portion of the touch electrode connection line 152 may receive a touch driving signal from the touch driver circuit and transmit the same to the touch electrodes 155 and 156, and may receive a touch sensing signal from the touch electrodes 155 and 156 and may transmit the same to the touch driver circuit.

A touch protective film 157 may be disposed on the touch electrodes 155 and 156. In the drawing, it is shown that the touch protective film 157 is disposed only on the touch electrodes 155 and 156. However, the present disclosure is not limited thereto. The touch protective film 157 may extend to an inner end or an outer end of the dam DAM and thus may also be disposed on the touch electrode connection line 152.

Further, a color filter (not shown) may be further disposed on the encapsulation layer 120, and the color filter may be positioned on the touch layer or between the encapsulation layer 120 and the touch layer.

Figure 3:
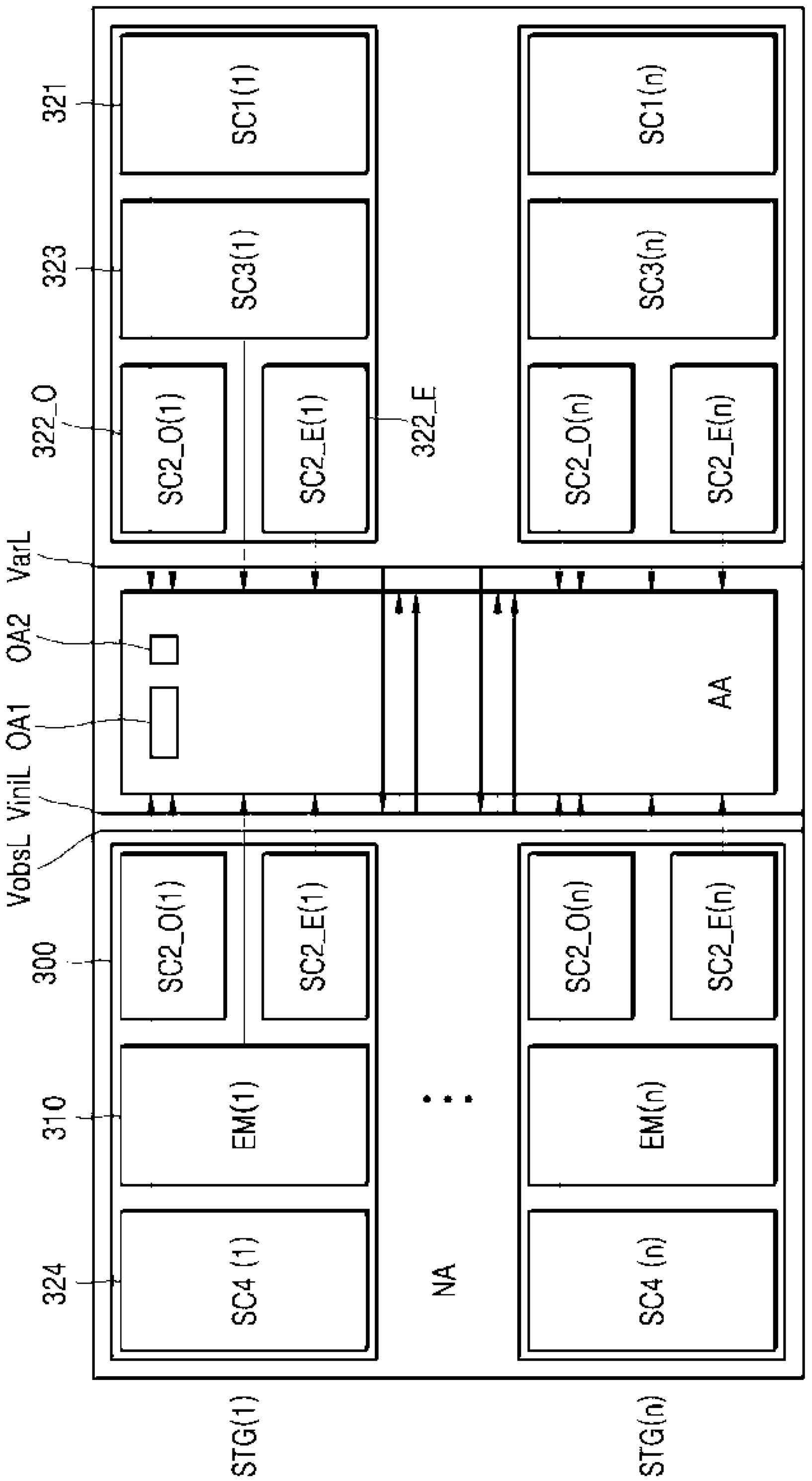
FIG. 3 shows a block diagram of a gate driver of a display device according to one aspect.

FIG. 3 is a diagram of a configuration of a gate driver in a display device according to an aspect.

Referring to FIG. 3, the gate driver 300 includes a light-emission control signal driver 310 and a scan driver 320. The scan driver 320 may include a first scan driver to a fourth scan driver 321, 322, 323, and 324. Further, the second scan driver 322 may be composed of an odd-numbered second scan driver 322_O and an even-numbered second scan driver 322_E.

The gate driver 300 may include shift registers which may be respectively disposed on both opposing sides of the display area AA symmetrically. Further, in the gate driver 300, the shift register on one side of the display area AA may be configured to include the second scan drivers 322_O and 322_E, the fourth scan driver 324 and the light-emission control signal driver 310. The shift register on the other side of the display area AA may be configured to include the first scan driver 321, the second scan drivers 322_O and 322_E, and the third scan driver 323. However, the present disclosure is not limited thereto, and the light-emission control signal driver 310 and the first to fourth scan drivers 321, 322, 323, and 324 may be arranged in a manner varying according to embodiments.

Each of stages STG(1) to STG(n) of the shift register may include each of first scan signal generators SC1(1) to SC1(*n*), each of second scan signal generators SC2_O(1) to SC2_O(n) and SC2_E(1) to SC2_E(n), each of third scan signal generators SC3(1) to SC3(*n*), each of fourth scan signal generators SC4(1) to SC4(*n*) and each of light-emission control signal generators EM(1) to EM(n).

The first scan signal generators SC1(*n*) to SC1(*n*) respectively output first scan signals SC1(*n*) to SC1(*n*) via a first scan line SCL1 of the display panel 100. The second scan signal generators SC2(1) to SC2(*n*) respectively output second scan signals SC2(1) to SC2(*n*) via a second scan line SCL2 of the display panel 100. The third scan signal generators SC3(1) to SC3(*n*) respectively output third scan signals SC3(1) to SC3(*n*) via a third scan line SCL3 of display panel 100. The fourth scan signal generators SC4(1) to SC4(*n*) respectively output fourth scan signals SC4(1) to SC4(*n*) via fourth scan line SCL4 of the display panel 100. The light-emission control signal generators EM(1) to EM(n) respectively output light-emission control signals EM(1) to EM(n) via a light-emission control line EML of the display panel 100.

The first scan signals SC1(*n*) to SC1(*n*) may be used as signals for operating an A-th transistor included in the pixel circuit such as a compensation transistor. The second scan signals SC2(1) to SC2(*n*) may be used as signals for operating a B-th transistor included in the pixel circuit, such as a data supply transistor. The third scan signals SC3(1) to SC3(*n*) may be used as signals for operating a C-th transistor included in the pixel circuit, such as a bias transistor. The fourth scan signals SC4(1) to SC4(*n*) may be used as signals for operating a D-th transistor included in the pixel circuit, such as an initialization transistor. The light-emission control signals EM(1) to EM(n) may be used as signals for operating an E-th transistor included in the pixel circuit, such as a light-emission control transistor. For example, when light-emission control transistors of pixels are controlled using the light-emission control signals EM(1) to EM(n), an emission time of the light-emitting element is varied.

Referring to FIG. 3, a bias voltage bus line VobsL, a first initialization voltage bus line VarL, and a second initialization voltage bus line ViniL may be disposed between and connected to the gate driver 300 and the display area AA.

The bias voltage bus line VobsL, the first initialization voltage bus line VarL, and the second initialization voltage bus line ViniL may respectively a supply bias voltage Vobs, a first initialization voltage Var, and a second initialization voltage Vini from a power supply 500 to the pixel circuit.

In the drawing, it is shown that the bias voltage bus line VobsL, the first initialization voltage bus line VarL, and the second initialization voltage bus line ViniL are disposed on only one of a left or right side of the display area AA. However, the present disclosure is not limited thereto. The bias voltage bus line VobsL, the first initialization voltage bus line VarL, and the second initialization voltage bus line ViniL may be disposed on each of both opposing sides of the display area AA. When the bias voltage bus line VobsL, the first initialization voltage bus line VarL, and the second initialization voltage bus line ViniL is disposed on one of both opposing sides of the display area AA, one side is not limited to the left or right side.

Referring to FIG. 3, at least one optical area OA1 and OA2 may be disposed in the display area AA.

The at least one optical area OA1 and OA2 may be positioned to overlap at least one optical and electronic device, such as a capturing device such as a camera (an image sensor), and a detection sensor such as a proximity sensor and a luminance sensor.

For operation of the optical electronic device, the at least one optical area OA1 and OA2 may have a light transmissive structure and thus may have a transmittance equal to or greater than a predefined value. In other words, the number of pixels P per unit area in at least one optical area OA1 and OA2 may be smaller than the number of pixels P per unit area in a general area of the display area AA except for the at least one optical area OA1 and OA2. That is, a resolution of at least one optical area OA1 and OA2 may be lower than that of the general area of the display area AA.

The light transmissive structure of the at least one optical area OA1 and OA2 may be formed by patterning a cathode electrode in an area where the pixel P is not disposed. At this time, a portion of the cathode electrode to be patterned may be removed using a laser. Alternatively, the cathode electrode may be selectively formed to be patterned using a material such as a cathode deposition prevention layer.

Alternatively, the light transmissive structure of the at least one optical area OA1 and OA2 may be formed by forming the light-emitting element OLED and the pixel circuit in a separated manner in the pixel P. In other words, the light-emitting element OLED of the pixel P may be positioned on the at least one optical area OA1 and OA2, while a plurality of transistors TFT constituting the pixel circuit may be disposed around the at least one optical area OA1 and OA2, and the light-emitting element OLED and the pixel circuit may be electrically connected to each other via a transparent metal layer.

Figure 4:
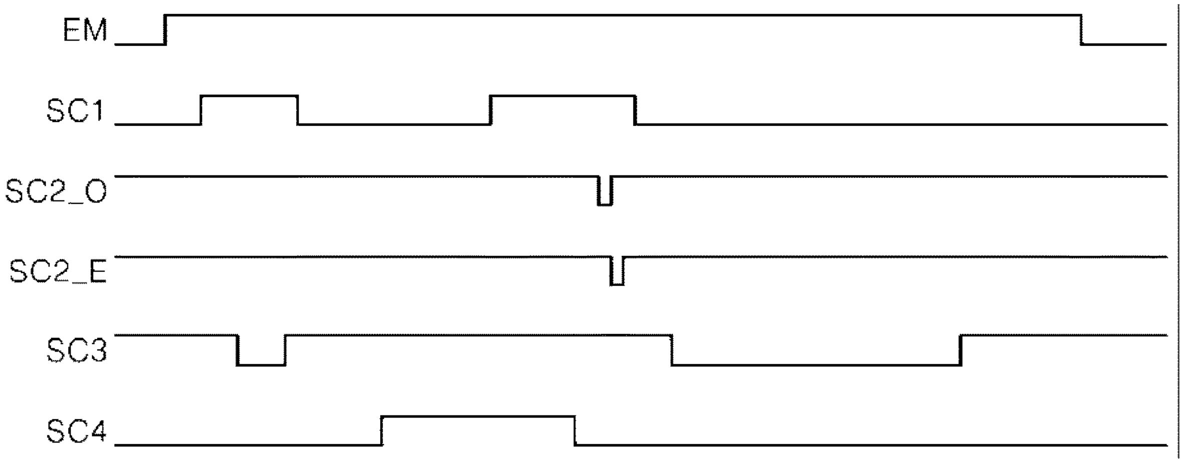
FIG. 4 shows a timing diagram in a refresh frame in a display device according to one aspect.
Figure 5:
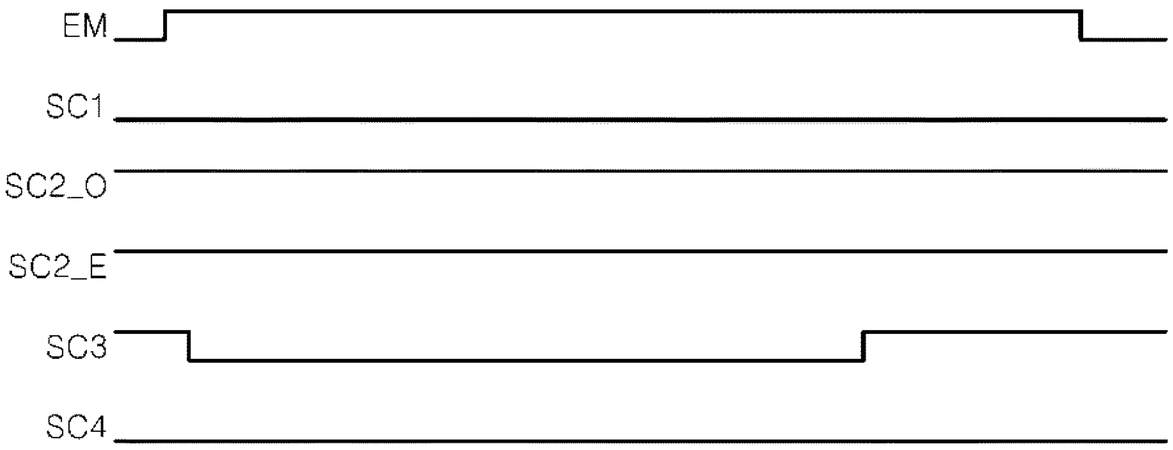
FIG. 5 shows a timing diagram in an anode reset frame in a display device according to one aspect.

FIG. 4 shows a timing diagram of a refresh frame in a display device according to one aspect. FIG. 5 shows a timing diagram of an anode reset frame in a display device according to one aspect.

Referring to FIG. 4 and FIG. 5, in this aspect, the third scan signal SC3 may be enabled in the initialization period and the stress period of the refresh frame and the anode reset frame.

In this case, in the present aspect, the display device may adjust at least one of a pulse width or a toggle timing of the third scan signal SCAN3 [*n*] based on an operating frequency or a luminance band.

The sixth transistor T6 and the seventh transistor T7 respectively apply the second initialization voltage VAR to the anode of the light-emitting element OLED and the on-bias stress voltage VOBS to the source electrode of the driving transistor D-TFT in response to the third scan signal SCAN3[*n*] enabled in an initialization period and a stress period of a refresh frame, and an anode reset frame.

Figure 6:
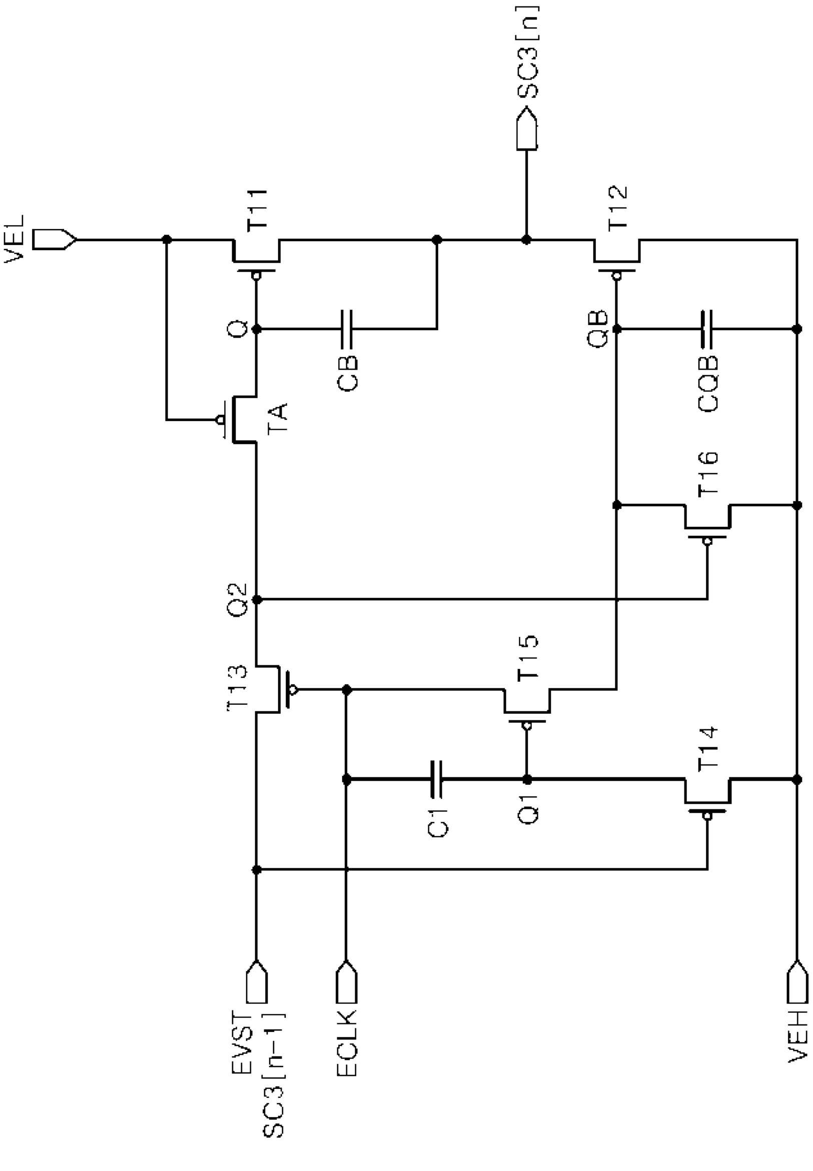
FIG. 6 shows a gate driver circuit in a display device according to one aspect.

FIG. 6 shows a gate driver circuit in a display device according to one aspect.

Referring to FIG. 6, the gate driver circuit may include a pull-up transistor T11, a pull-down transistor T12, a transfer transistor TA, an eighth transistor T13, a ninth transistor T14, a tenth transistor T15, an eleventh transistor T16, a capacitor CB, a capacitor CQB, and a capacitor C1.

The pull-up transistor T11 may pull-up an output stage in response to a signal of a Q node, and the pull-down transistor T12 may pull-down the output stage in response to a signal of a QB node.

The transfer transistor TA transfers charges of a Q2 node to the Q node in response to a low-potential voltage VEL.

The eighth transistor T13 provides a start signal EVST or an output signal SC3[*n*−1] of a previous stage to the Q2 node in response to a clock signal ECLK.

The ninth transistor T14 transmits a high-potential voltage VEH to a Q1 node in response to the start signal EVST or the output signal SC3[*n*−1] of the previous stage.

The tenth transistor T15 provides the clock signal ECLK to the QB node in response to a voltage of the Q1 node.

The eleventh transistor T16 transmits the high-potential voltage VEH to the QB node in response to a voltage of the Q2 node.

The capacitor CB is disposed between and connected to the Q node and the output. The capacitor CQB is disposed between and connected to the QB node and the high-potential voltage VEH. The capacitor C1 is disposed between and connected to the clock signal ECLK and the drain electrode of the transistor T14 and is disposed between and connected to the clock signal ECLK and a gate electrode of the transistor T15.

The flicker phenomenon due to different flicker characteristics based on different operating frequencies or DBVs is as follows.

Figure 7:
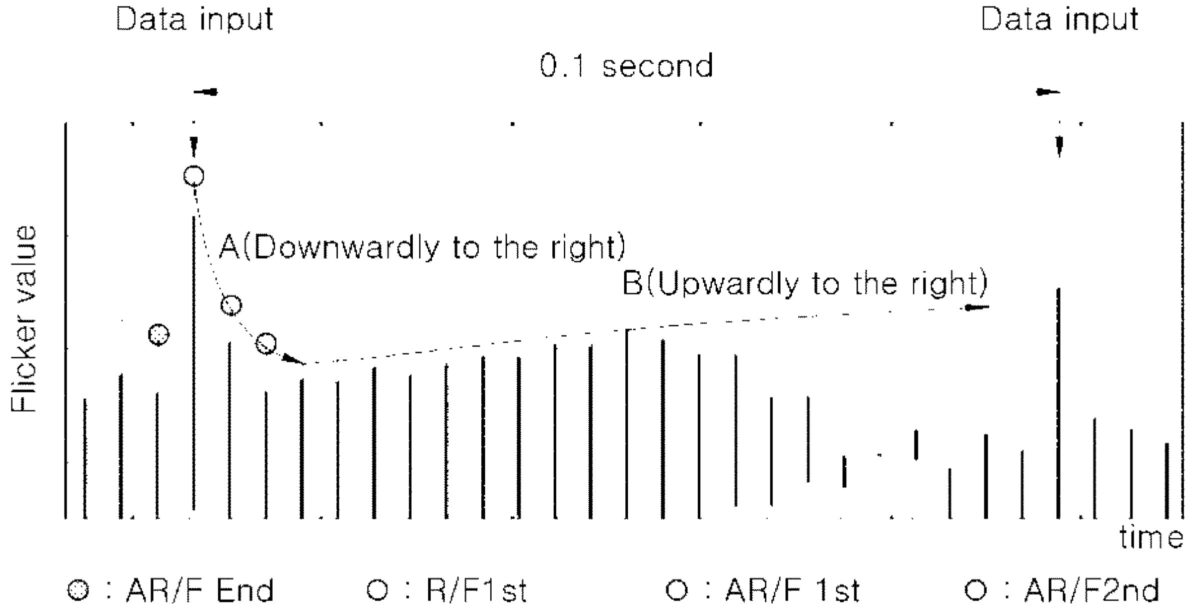
FIG. 7 shows change in flicker characteristics in a refresh frame and an anode reset frame of a display device according to one aspect.

FIG. 7 shows change in a flicker value in the refresh frame and the anode reset frame of a display device according to one aspect.

Referring to FIG. 7, in a first refresh frame R/F 1st of the display device, the flicker value rises upon input of data Data, and then falls downwardly to a right (a section A) as a time elapses. Then, in a first anode reset frame AR/F 1st, and a second anode reset frame AR/F 2nd, the flicker value gradually rises upwardly to a right (a section B) upon input of a on-bias stress voltage and an anode reset voltage. Then, in a next refresh frame, the flicker value rises upon input of the data Data.

The flicker value-related characteristics in the sections A and B may be changed by changing a timing of the third scan signal for application of the on-bias stress voltage and the anode reset voltage. In this regard, the third scan signal may be defined as a scan signal for applying the anode reset voltage to the anode electrode of the light-emitting element and applying the on-bias stress voltage to the source electrode of the driving transistor in the stress period of each of the refresh frame and the refresh skip frame or the anode reset frame. The third scan signal may be provided from the gate driver circuit to the pixel circuit.

The flicker characteristics may vary based on variation in each of the operating frequency and the DBV (Display Bright Value). For example, a flicker average value may vary depending on the DBV value when the operating frequency is constant and is 10 Hz while the DBV value switches between 10 and 100. Alternatively, when the DBV value is constant and is 10 and the operating frequency switches between 10 Hz and 1 Hz, the flicker average value may vary depending on the operating frequency. In this way, the flicker value at the constant operating frequency may vary depending on the DBV value. Alternatively, when the DBV value is constant, the flicker value may vary depending on the operating frequency.

The present embodiments are intended to provide a display device which may adjust a scan frequency of the third scan signal in consideration of the flicker characteristic as described above to reduce the flicker. Further, the present embodiments are intended to provide a display device which in which at least one of a pulse width or a toggle timing of the third scan signal is adjusted based on at least one of the operating frequency or the luminance band to prevent the flicker phenomenon even when the operating frequency or the DBV is changed during an operation in the VRR mode.

Figure 8:
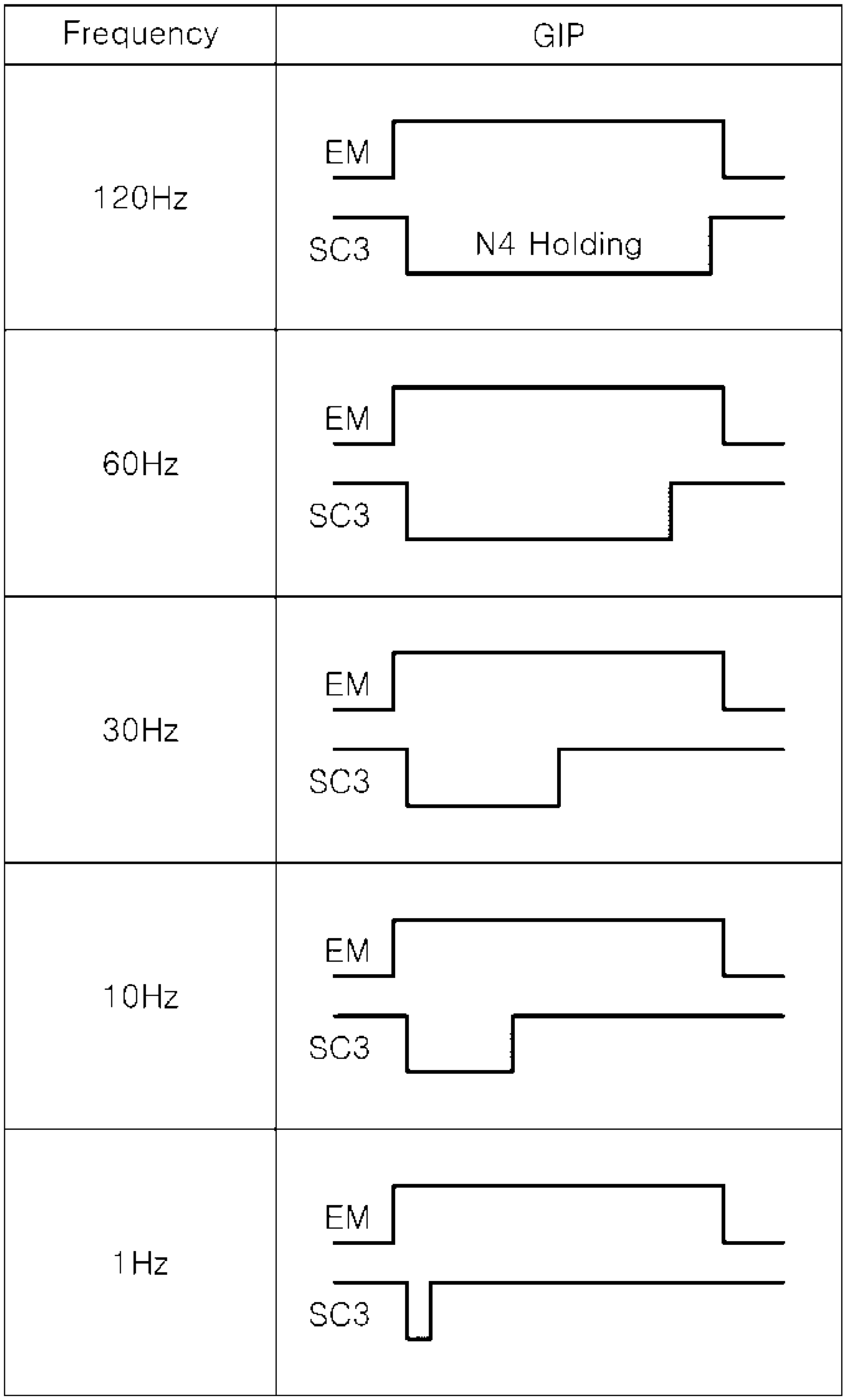
FIG. 8 shows variation of a pulse width of a third scan signal based on variation of an operating frequency in a display device according to one aspect.

FIG. 8 shows the variation in the pulse width of the third scan signal SC3 based on the variation in the operating frequency in the display device according to one aspect.

Referring to FIG. 8, the pulse width of the third scan signal SC3 may be varied according to the change of the operating frequency. In one example, as the operating frequency decreases to 120 Hz, 60 Hz, 30 Hz, 10 Hz, and 1 Hz, the pulse width of the third scan signal SC3 may be reduced.

In FIG. 8, a high logic level of the emission signal EM may indicate a refresh frame, and a pulse width of a low logic level of the third scan signal SC3 may indicate a period for which at least one of the on-bias stress voltage or the anode reset voltage is applied to the pixel circuit. A hatched section of the third scan signal SC3 may indicate that a time duration for which at least one of the on-bias stress voltage or the anode reset voltage is applied to the pixel circuit decreases as the operating frequency decreases.

In this way, the pulse width of the scan signal may be reduced in proportion to the reduction in the operating frequency. Thus, the time duration for which the on-bias stress voltage and the anode reset voltage are applied respectively in the refresh frame and the anode reset frame is reduced as the operating frequency is changed to a low frequency.

Figure 9:
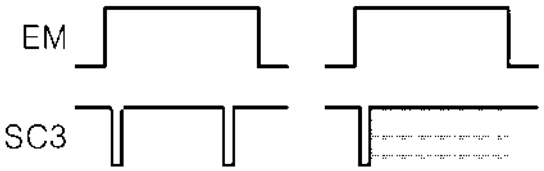
FIG. 9 shows a toggle timing shift of a third scan signal based on variation of a luminance band in the display device according to one aspect.
Figure 9:
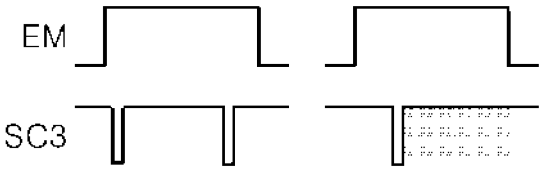
Figure 9:
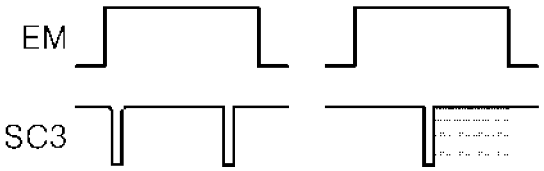
Figure 9:
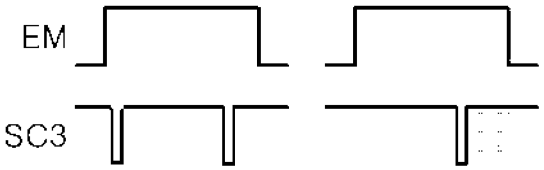
Figure 9:
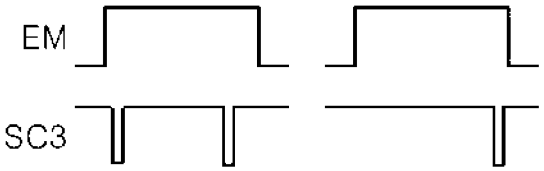

FIG. 9 shows shift of a toggle timing of the third scan signal based on the variation of the luminance band in the display device according to one aspect.

Referring to FIG. 9, when the luminance band changes due to the change in DBV (Display Bright Value), the toggle timing of the third scan signal may be shifted. In one example, as the luminance band increases from a first luminance band to a seventh luminance band, to an eighth luminance band to a ninth luminance band, to a tenth luminance band, to an eleventh luminance band, to a twelfth luminance band, and to a thirteenth luminance band, the toggle timing of the third scan signal may be increasingly delayed.

In FIG. 9, a first high logic level of the emission signal EM may indicate a refresh frame, and a second high logic level of the emission signal EM may indicate a refresh skip frame. The refresh frame may represent a period of applying a data voltage to refresh an image. The refresh skip frame may represent a period of maintaining an image when the display device is operating at the low frequency.

In FIG. 9, a pulse width of a low logic level of the third scan signal SC3 may indicate a time duration for which the on-bias stress voltage and the anode reset voltage are applied to the pixel circuit respectively in the refresh frame and the refresh skip frame. A hatched section of the third scan signal SC3 may indicate a time duration from a point when at least one of the on-bias stress voltage or the anode reset voltage is applied to the pixel circuit to a point when the emission period starts. The emission period represents a period for which the emission signal EM transitions to a low logic level such that the light-emitting element emits light. That is, the toggle timing of the third scan signal may be increasingly delayed as the luminance band increases.

As shown in FIG. 8 and FIG. 9, the flicker characteristics may be improved by varying the pulse width of the third scan signal according to the change in the operating frequency or by delaying the toggle timing of the third scan signal according to the change in the luminance band. Additionally, if necessary, the flicker characteristic based on the temperature may be improved by additionally adjusting the pulse width or the toggle timing of the third scan signal according to change in a temperature of the pixel circuit.

Figure 10:
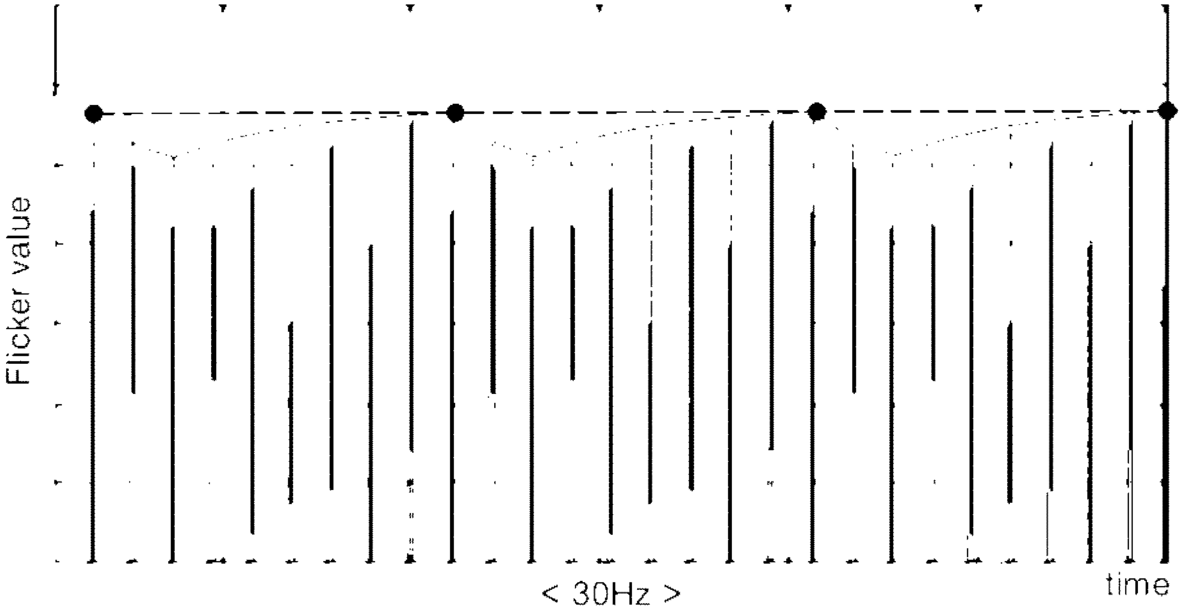
FIG. 10 shows a sample in which flicker characteristics are optimized at an operating frequency of 30 Hz in a display device according to one aspect.
Figure 11:
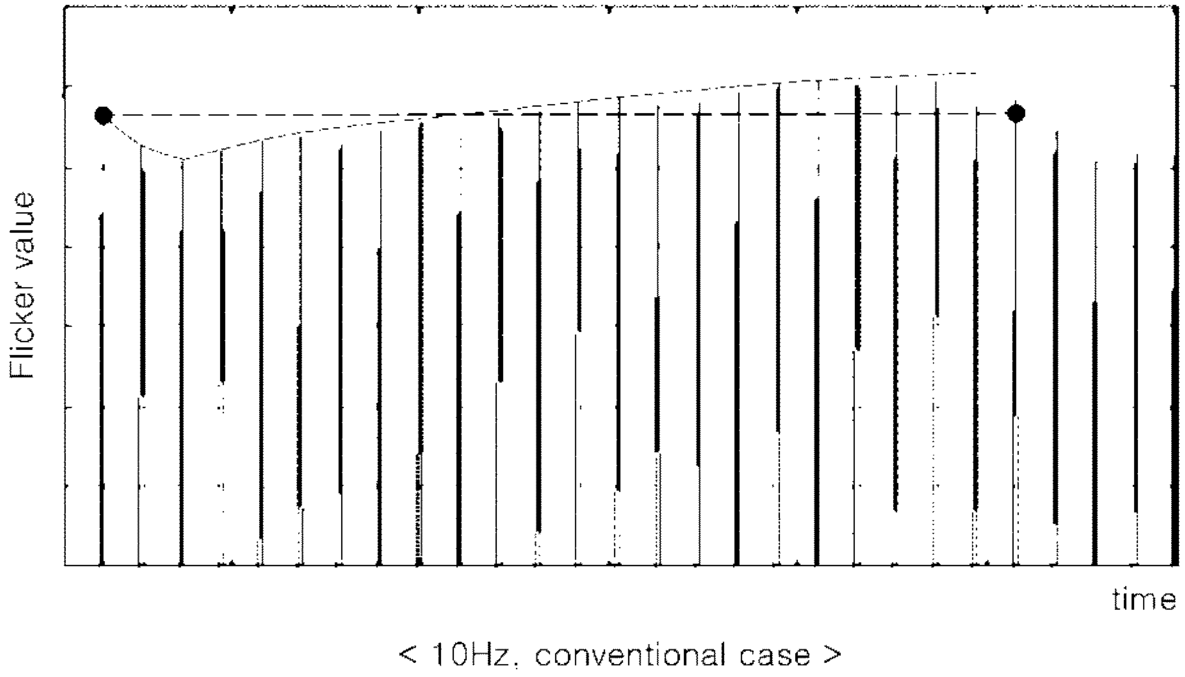
FIG. 11 shows flicker characteristics when an operating frequency is changed from 30 Hz to 10 Hz before applying the present aspect.
Figure 12:
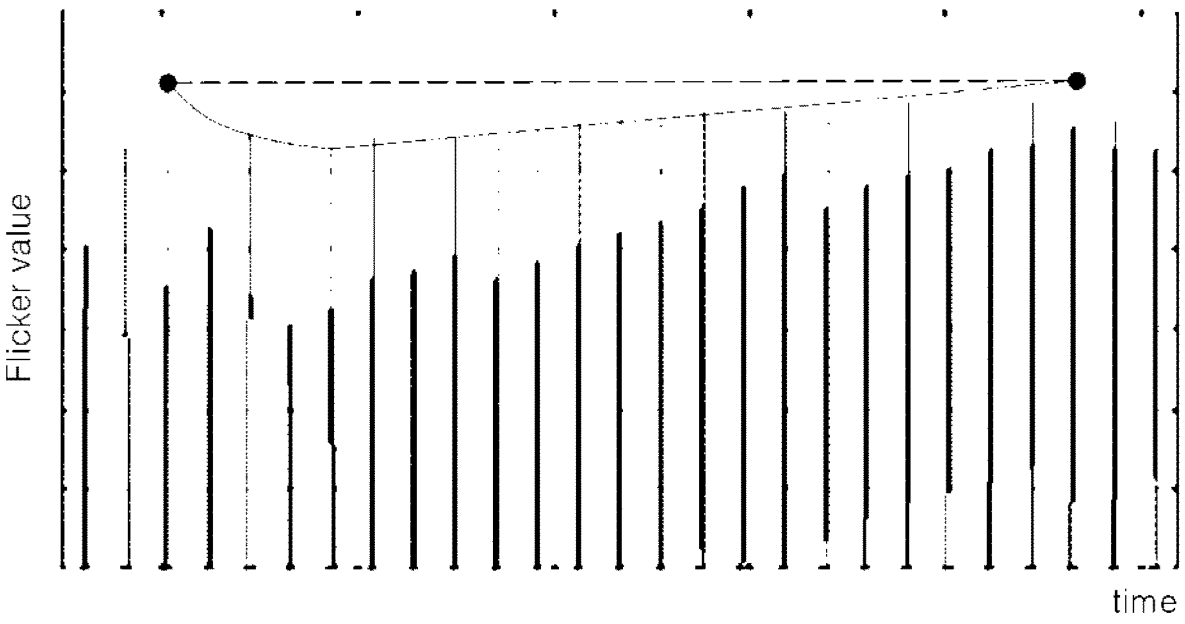
FIG. 12 shows flicker characteristics when an operating frequency is changed from 30 Hz to 10 Hz after applying the present aspect.

FIG. 10 shows a sample in which flicker characteristics are optimized at an operating frequency of 30 Hz in a display device according to one aspect. FIG. 11 shows the flicker characteristics when changing the operating frequency from 30 Hz to 10 Hz before applying the present aspect. FIG. 12 shows the flicker characteristics when the operating frequency is changed from 30 Hz to 10 Hz after applying the present aspect.

In FIG. 10 to FIG. 12, a dotted line may indicate a reference value at which the human may recognize the flicker when the flicker occurs. A dot may indicate a point in time at which the data is applied to the pixel circuit in the refresh frame. A distance between adjacent dots may indicate a period of the refresh frame.

FIG. 10 shows a sample in which the flicker characteristics are optimized at an operating frequency of 30 Hz. When the operating frequency is changed from 30 Hz to 10 Hz, the flicker value exceeds the reference value as shown in FIG. 11, and thus the human recognizes the flicker. Thus, the flicker characteristics may deteriorate.

On the other hand, as shown in FIG. 11, according to the present aspect, the display device may vary the pulse width of the third scan signal or shift the toggle timing of the third scan signal according to the change in the operating frequency or the change in the luminance band, such that the flicker characteristics may be optimized at all operating frequencies, such as FIG. 10 Hz and 30 Hz.

Figure 13:
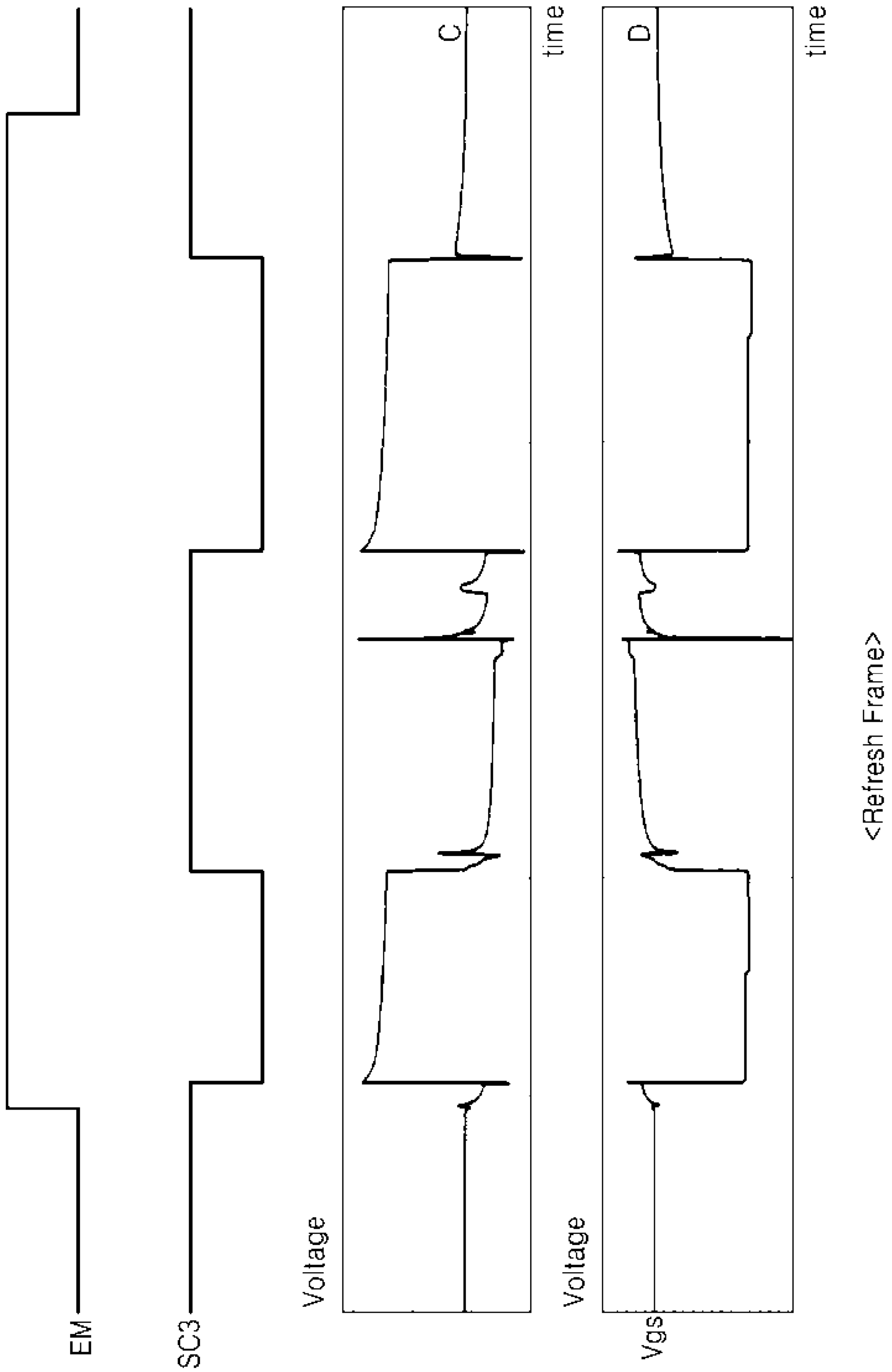
FIG. 13 shows waveforms of a threshold voltage and a gate-source voltage of a driving transistor in a refresh frame based on a timing of a scan signal in a display device according to one aspect.
Figure 14:
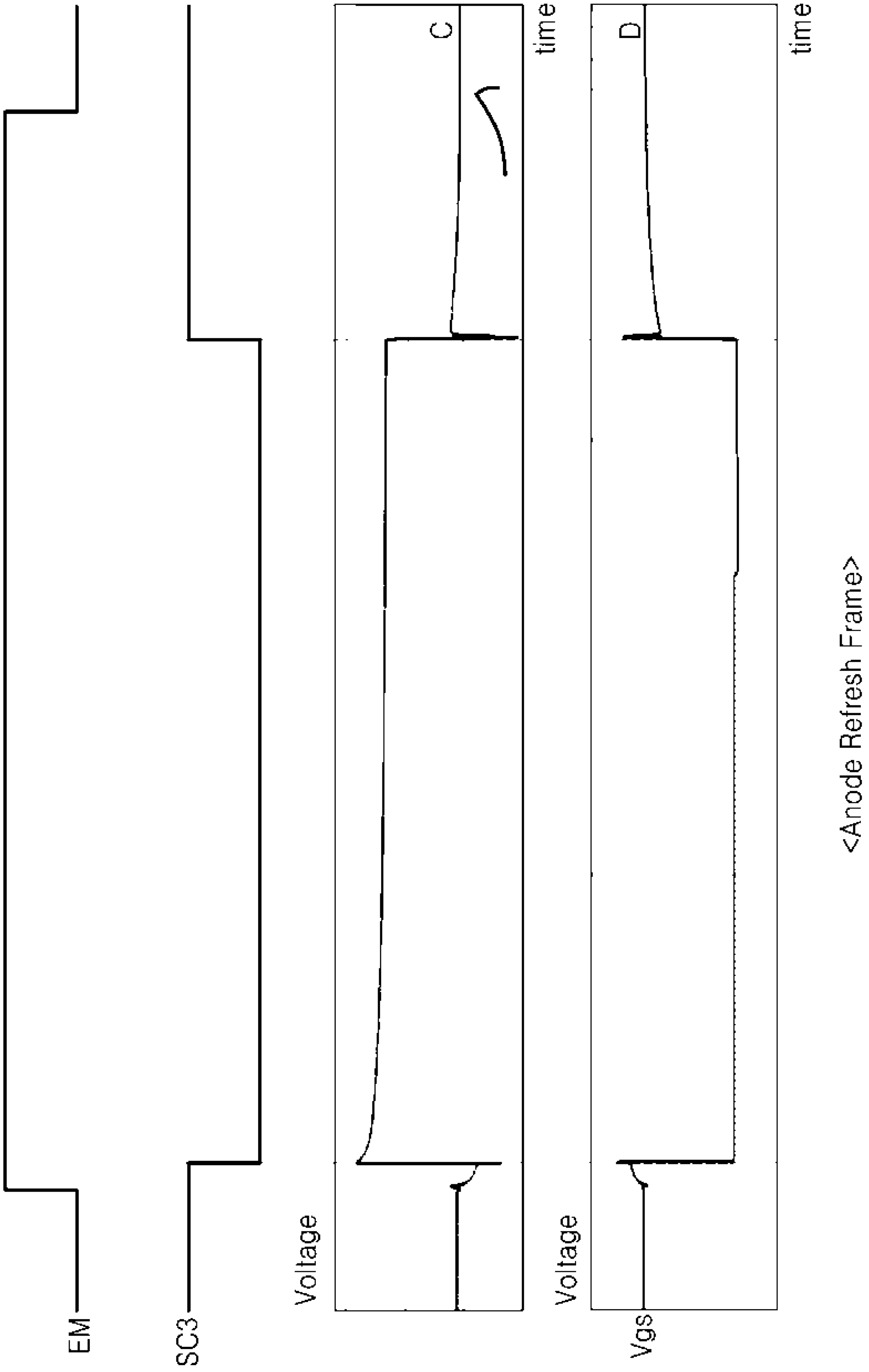
FIG. 14 shows waveforms of a threshold voltage and a gate-source voltage of a driving transistor in an anode reset frame based on a timing of a scan signal in a display device according to one aspect.

FIG. 13 shows a waveform of each of a threshold voltage and a gate-source voltage of the driving transistor in the refresh frame based on the timing of the scan signal in the display device according to one aspect. FIG. 14 shows a waveform of the threshold voltage and the gate-source voltage of the driving transistor in the anode reset frame based on the timing of the scan signal in a display device according to an aspect.

In FIGS. 13 and 14, C represents a value of a threshold voltage Vth of the driving transistor that varies in each of the refresh frame and the anode reset frame. D represents a value of a gate-source voltage VGS of the driving transistor that varies in each of the refresh frame and the anode reset frame.

The threshold voltage value C of the driving transistor after the anode reset frame may be reduced compared to the threshold voltage value C after the refresh frame. In one example, in the initialization period, the sampling period, and the stress period of the refresh frame, the initialization voltage, the data voltage, the on-bias stress voltage, and the anode reset voltage may be applied. However, in the stress period of the anode reset frame, only the on-bias stress voltage and the anode reset voltage are applied. Thus, the threshold voltage value C of the driving transistor after the anode reset frame may be reduced compared to the threshold voltage value C after the refresh frame.

When the gate-source voltage VGS and the threshold voltage Vth of the driving transistor D-TFT before the emission signal EM is turned on are equal to each other, the flicker characteristics may be the best. A luminance difference due to a difference between the threshold voltage Vth and the gate-source voltage VGS of the driving transistor D-TFT is accumulated as the frames elapse. The accumulated luminance difference may be perceived by the human eye as the flicker.

The threshold voltage Vth of the driving transistor D-TFT in the anode reset frame may be reduced compared to the threshold voltage Vth of the driving transistor D-TFT in the refresh frame. The gate-source voltage VGS in the anode reset frame may be equal to that in the refresh frame.

The flicker characteristics are the best when the threshold voltage Vth and the gate-source voltage VGS of the driving transistor D-TFT are equal to each other. Thus, the threshold voltage Vth may be changed by varying the pulse width of the third scan signal SC3 or by shifting the toggle timing thereof such that the difference between the threshold voltage Vth of the driving transistor D-TFT and the gate-source voltage VGS thereof in each of the refresh frame and the anode reset frame is minimized to minimize the flicker. Thus, the flicker characteristics may be optimized.

Figure 15:
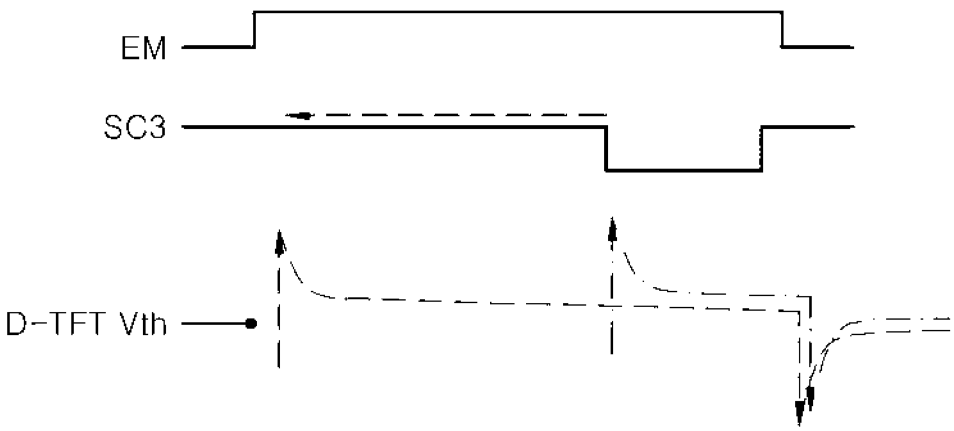
FIG. 15 and FIG. 16 show variation of a threshold voltage of a driving transistor based on a timing of a scan signal in a display device according to one aspect.
Figure 16:
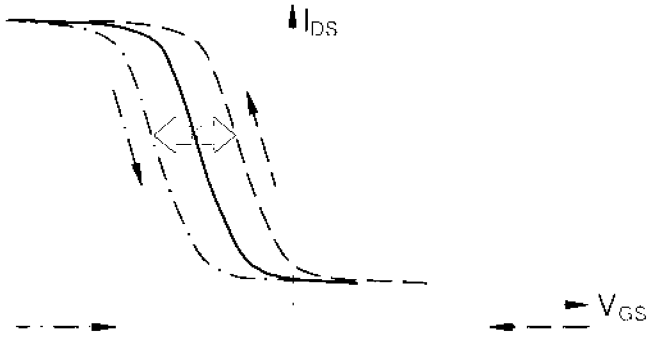

FIGS. 15 and 16 show variations in the threshold voltage Vth of the driving transistor D-TFT based on the timing of the third scan signal SC3 in a display device according to an aspect. In this regard, FIG. 15 shows the waveform thereof in the anode reset frame.

Referring to FIGS. 15 and 16, it may be identified that the threshold voltage Vth of the driving transistor D-TFT shifts in a negative direction as a time duration for which the on-bias stress voltage is applied increases.

When the third scan signal SC3 is tuned off, a voltage of a node corresponding to the drain electrode of the driving transistor D-TFT increases. As a result, a voltage of a node corresponding to the source electrode of the driving transistor D-TFT increases. At this time, the threshold voltage Vth of the driving transistor D-TFT is shifted in the negative direction.

Figure 17:
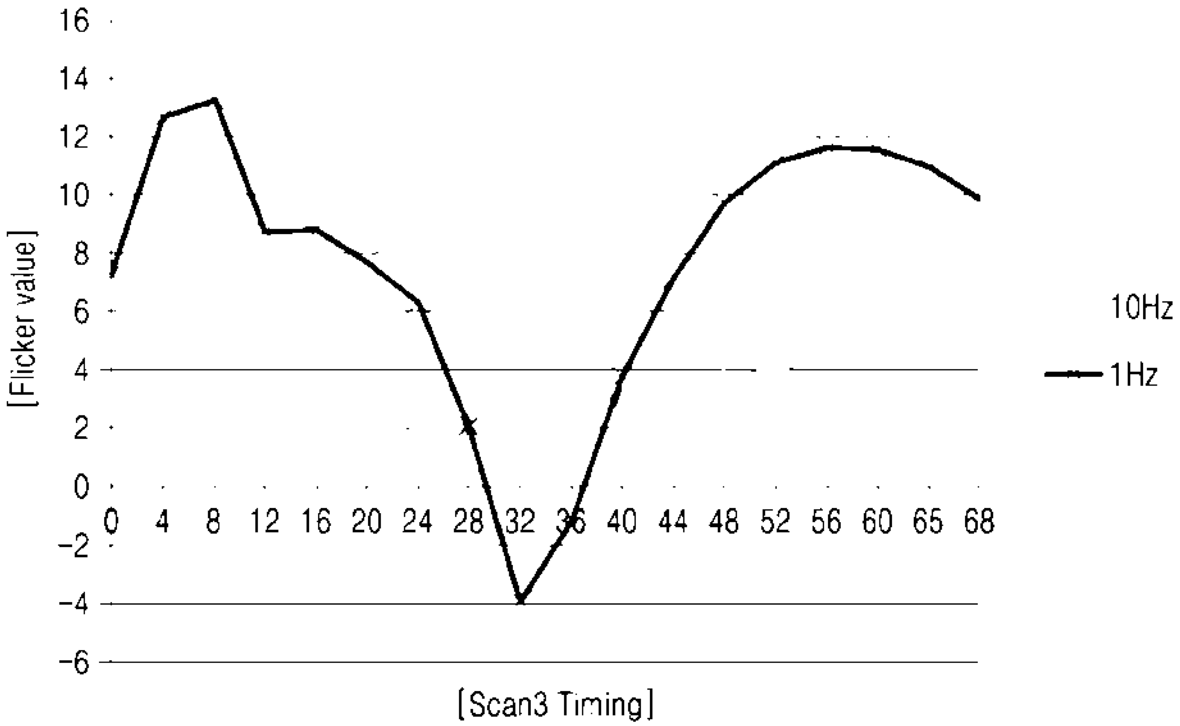
FIG. 17 shows an optimal timing of a scan signal based on an operating frequency in a display device according to another aspect.
Figure 18:
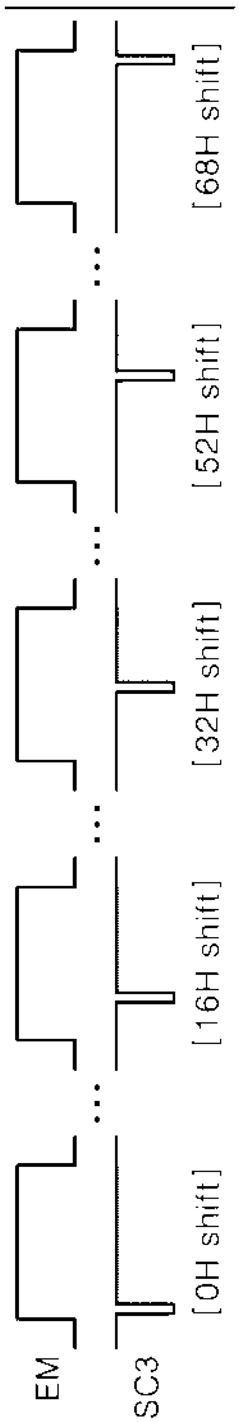
FIG. 18 shows a toggle shift of a scan signal based on an operating frequency in a display device according to another aspect.

FIG. 17 shows optimal timing of the scan signal at operating frequencies of 10 Hz and 1 Hz in a display device according to another aspect. FIG. 18 shows shift of a toggle timing of a scan signal according to a change in the operating frequency in a display device according to another aspect.

Referring to FIG. 17 and FIG. 18, the optimal timing of the third scan signal at each frequency is shown. In one example, the flicker characteristics are the best when the toggle timing shifts by 8H when the operating frequency is 10 Hz and the luminance band is 11. The flicker characteristics are the best when the toggle timing shifts by 32H when the operating frequency is 1 Hz and the luminance band is 11. An example of the shift of the toggle timing of the third scan signal is shown. A shift value of the toggle timing of the scan signal at each frequency may be preset in a lookup table.

In FIG. 18, the emission signal EM may indicate a refresh frame. A pulse width of a low logic level of the third scan signal SC3 may indicate the time duration for which each of the bias stress voltage and the anode reset voltage is applied to the pixel circuit in the refresh frame. A hatched section of the third scan signal SC3 may indicate the time duration from a point when at least one of the on-bias stress voltage or the anode reset voltage is applied to the pixel circuit to a point when the emission period starts.

Figure 19:
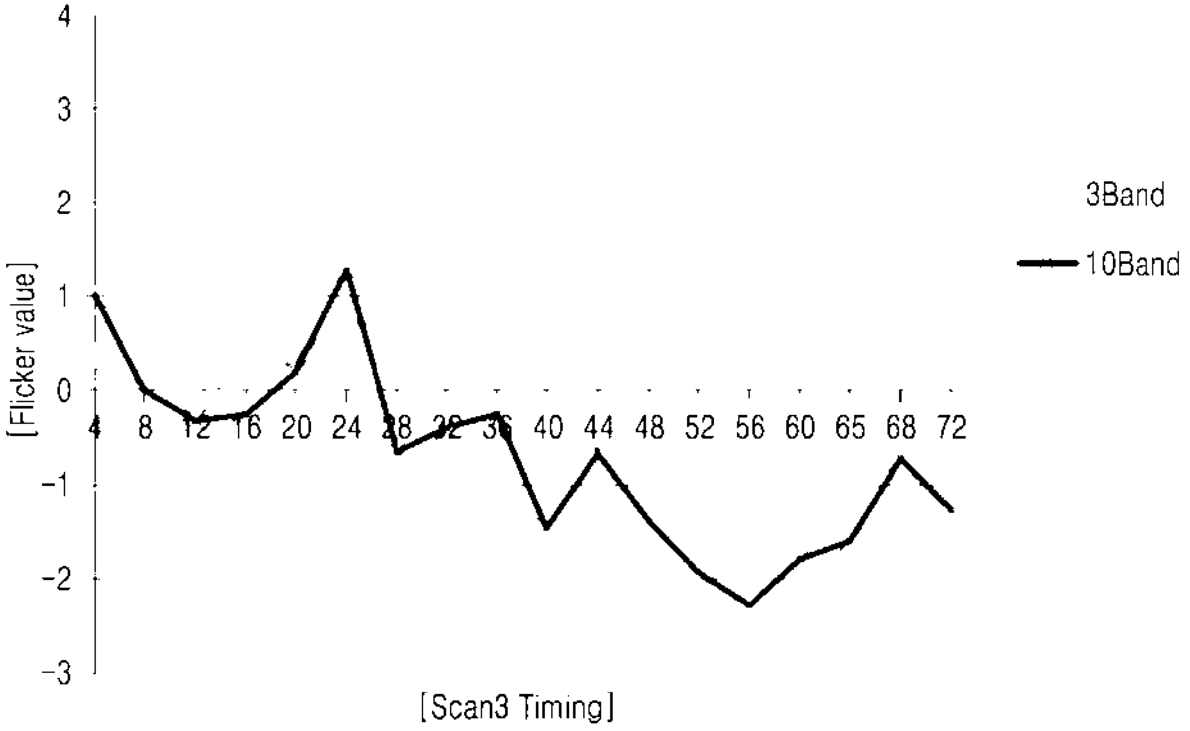
FIG. 19 shows an optimal timing of a scan signal based on a luminance band in a display device according to another aspect.
Figure 20:
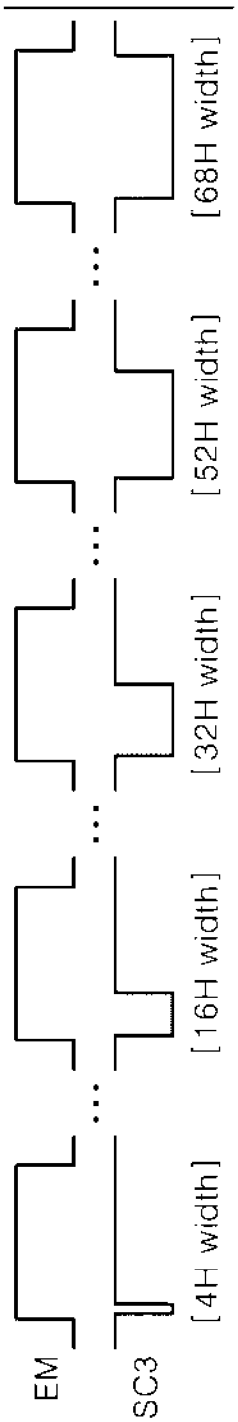
FIG. 20 shows variation in a pulse width of a scan signal based on different luminance bands in a display device according to another aspect.

FIG. 19 shows optimal timing of the scan signal based on the luminance band in a display device according to another aspect. FIG. 20 shows variation in the pulse width of the scan signal based on the luminance band in a display device according to another aspect.

Referring to FIG. 19 and FIG. 20, an optimal pulse width of the third scan signal based on the luminance band is shown. In one example, in an operating frequency of 10 Hz and the luminance band of 3, the flicker characteristics are best when the pulse width of the third scan signal is 8H. In an operating frequency of 10 Hz and the luminance band of 10, the flicker characteristics are best when the pulse width of the third scan signal is 56H.

An example of the variation in the pulse width of the third scan signal is shown. The variation value of the pulse width of the third scan signal based on the luminance band may be preset in a lookup table.

In FIG. 20, a high logic level of the emission signal EM may indicate the refresh frame. A pulse width of a low logic level of the third scan signal SC3 may indicate a time duration for which at least one of the on-bias stress voltage or the anode reset voltage is applied to the pixel circuit. A hatched section of the third scan signal SC3 may indicate that the time duration for which at least one of the on-bias stress voltage or the anode reset voltage is applied to the pixel circuit is reduced.

Putting FIG. 17 to FIG. 20 together, the flicker characteristics may vary based on each of the luminance band and the operating frequency. The flicker characteristics may be changed based on each of the toggle timing of the third scan signal and the pulse width of the third scan signal.

In addition, the optimized timing of the third scan signal may vary based on each of the operating frequency and the luminance band.

Figure 21:
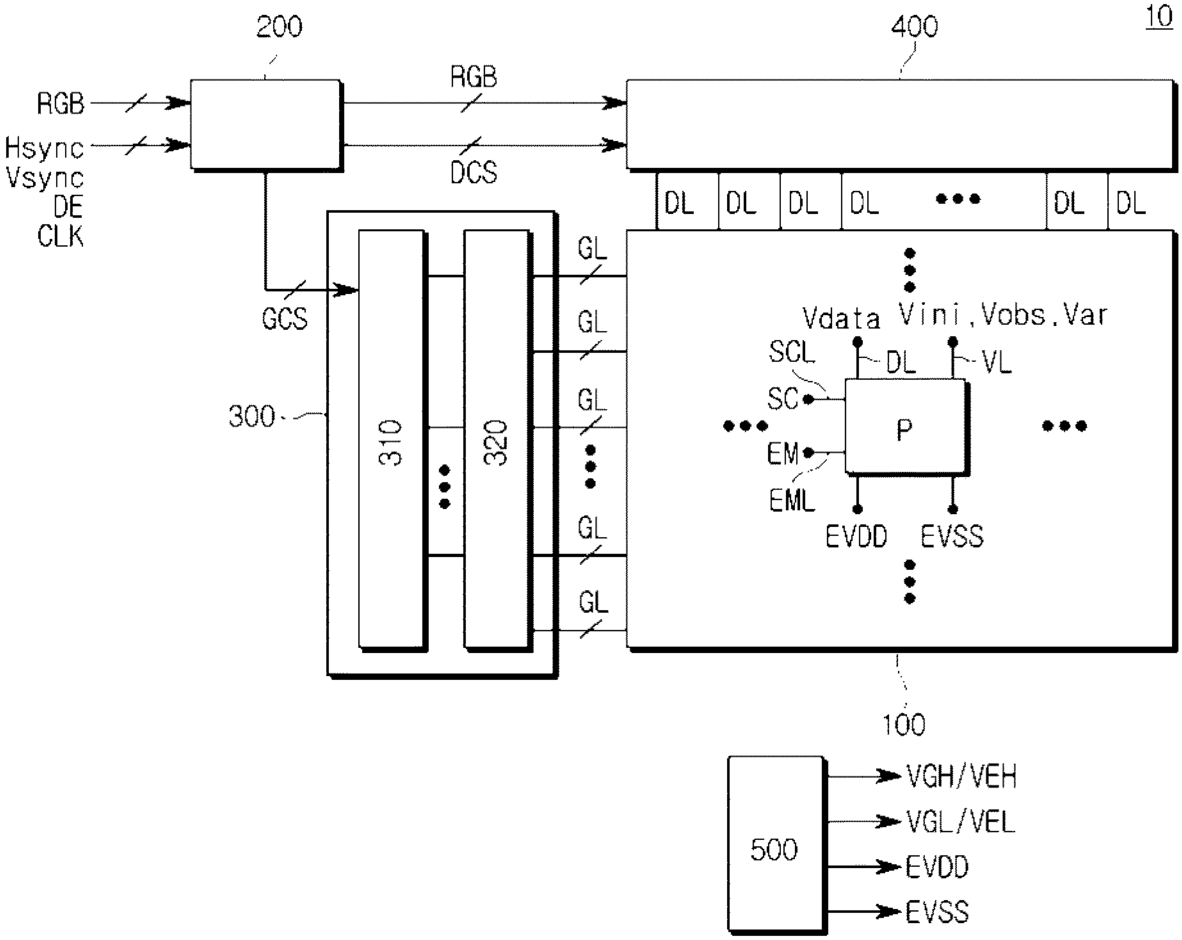
FIG. 21 is a block diagram schematically showing a display device according to one aspect of the present disclosure.

FIG. 21 is a block diagram schematically showing a display device according to one aspect of the present disclosure.

Referring to FIG. 21, the display device 10 includes the display panel 100 including a plurality of pixels P, a timing controller 200, the gate driver 300 that supplies a gate signal to each of the plurality of pixels P, a data driver 400 which that supplies a data signal to each of the plurality of pixels P, and the power supply 500 supplying power necessary for operating each of the plurality of pixels P.

The display panel 100 includes the display area (AA in FIG. 2) where the pixel P is positioned, and the non-display area (NA in FIG. 2) surrounding the display area AA. In the non-display area, the gate driver 300 and the data driver 400 are disposed.

In the display panel 100, a plurality of gate lines GL and a plurality of data lines DL intersect each other, and each of the plurality of pixels P is connected to the gate line GL and the data line DL. Specifically, one pixel P receives the gate signal from the gate driver 300 via the gate line GL, receives the data signal from the data driver 400 via the data line DL, and receives the high-potential driving voltage EVDD and the low-potential driving voltage EVSS from the power supply 500.

In this regard, the gate line GL supplies the scan signal SC and the light-emission control signal EM, and the data line DL supplies the data voltage Vdata. Further, according to various embodiments, the gate line GL may include a plurality of scan lines SCL supplying the scan signal SC and the light-emission control signal line EML supplying the light-emission control signal EM. Further, the plurality of pixels P may additionally include a power line VL and may receive the bias voltage Vobs and the initialization voltages Var and Vini via the power line VL.

Further, as shown in FIG. 2, each pixel P includes the light-emitting element OLED and the pixel circuit that controls the operation of the light-emitting element OLED. In this regard, the light-emitting element OLED includes the anode electrode 171, the cathode electrode 173, and the light-emitting layer 172 between the anode electrode 171 and the cathode electrode 173.

The pixel circuit includes a plurality of switching elements, a driving element, and a capacitor. In this regard, each of the switching element and the driving element may be embodied as a thin-film transistor. In the pixel circuit, the driving element controls an amount of the current supplied to the light-emitting element OLED based on the data voltage to adjust an amount of light emitted from the light-emitting element OLED. Further, the plurality of switching elements may receive the scan signal SC supplied via the plurality of scan lines SCL and the light-emission control signal EM supplied via the light-emission control line EML and may control the operation of the pixel circuit based on the received signals SC and EM.

The display panel 100 may be implemented as a non-transmissive type display panel or a transmissive type display panel. The transmissive display panel may be applied to a transparent display device in which an image is displayed on a screen and a real object of a background is visible to a viewer. The display panel 100 may be manufactured as a flexible display panel. The flexible display panel may be implemented as an OLED panel using a plastic substrate.

The pixels P may be classified into a red pixel, a green pixel, and a blue pixel for color rendering. The pixel P may further include a white pixel. Each of the pixels P includes the pixel circuit.

Touch sensors may be disposed on the display panel 100. Touch input may be sensed using separate touch sensors or through the pixels. The touch sensors may be disposed on the screen of the display panel in an on-cell manner or an add on manner or may be embedded in the display panel 100 in an in-cell manner.

The timing controller 200 processes image data RGB input from an external device based on the size and the resolution of the display panel 100 and supplies the processed image data to the data driver 400. The timing controller 200 generates a gate control signal GCS and a data control signal DCS using sync signals input from an external source, for example, a dot clock signal CLK, a data enable signal DE, a horizontal sync signal Hsync, and a vertical sync signal Vsync. The timing controller 200 supplies the generated gate control signal GCS and data control signal DCS to the gate driver 300 and the data driver 400, respectively to control the gate driver 300 and the data driver 400.

The timing controller 200 may be configured to be coupled to various processors, for example, a microprocessor, a mobile processor, an application processor, etc., depending on a type of a device on which the controller is mounted.

A host system may be any one of a television (TV) system, a set top box, a navigation system, a personal computer (PC), a home theater system, a mobile device, a wearable device, and a vehicle system.

The timing controller 200 multiplies an input frame frequency by i and controls an operation timing of a display panel driver using a frame frequency=the input frame frequency×i (i is a positive integer greater than 0) Hz. The input frame frequency is 60 Hz in the National Television Standards Committee (NTSC) scheme and is 50 Hz in the Phase-Alternating Line (PAL) scheme.

The timing controller 200 generates a signal so that the pixel may operate at various refresh rates. That is, the timing controller 200 generates operation-related signals such that the pixel may operate in a Variable Refresh Rate (VRR) mode or a refresh rate thereof may be switchable between a first refresh rate and the second refresh rate. For example, the timing controller 200 may simply change a rate of a clock signal, may generate a synchronization signal to generate a horizontal blank or a vertical blank, or may operate the gate driver 300 in a mask manner such that the pixel P may operate at various refresh rates.

The timing controller 200 generates, based on the timing signals Vsync, Hsync, and DE received from the host system, the gate control signal GSC for controlling the operation timing of the gate driver 300, and the data control signal DSC for controlling the operation timing of the data driver 400. The timing controller 200 controls an operation timing of the display panel driver to synchronize the gate driver 300 and the data driver 400 with each other.

A level shifter (not shown) converts a voltage level of the gate control signal GSC output from the timing controller 200 into a gate on voltage VGL and VEL and a gate off voltage VGH and VEH which in turn are supplied to the gate driver 300. The level shifter converts a low level voltage of the gate control signal GSC to a gate low voltage VGL, and converts a high level voltage of the gate control signal GSC to a gate high voltage VGH. The gate control signal GSC includes a start pulse and a shift clock.

The gate driver 300 supplies the scan signal SC to the gate line GL according to the gate control signal GCS supplied from the timing controller 200. The gate driver 300 may be disposed at one side or each of both opposing sides of the display panel 100 and in a GIP (Gate In Panel) manner.

The gate driver 300 sequentially outputs the gate signal to the plurality of gate lines GL under control of the timing controller 200. The gate driver 300 may shift the gate signal using a shift register and sequentially supply the shifted gate signal to the gate lines GL.

The gate signal may include the scan signal SC and the light-emission control signal EM in an organic light-emitting display device. The scan signal SC includes a scan pulse swinging between the gate on voltage VGL and the gate off voltage VGH. The light-emission control signal may include a light-emission control signal pulse that swings between the gate on voltage VEL and the gate off voltage VEH.

The scan pulse is synchronized with the data voltage Vdata to select pixels of a line to which data is to be written. The light-emission control signal defines a light-emitting time of each of pixels.

The gate driver 300 may include the light-emission control signal driver 310 and the at least one scan driver 320.

The light-emission control signal driver 310 outputs the light-emission control signal pulse in response to the start pulse and the shift clock received from the timing controller 200 and sequentially shifts the light-emission control signal pulse according to the shift clock.

Each of the at least one scan driver 320 outputs the scan pulse in response to the start pulse and the shift clock received from the timing controller 200, and shifts the scan pulse according to a shift clock timing.

The data driver 400 converts the image data RGB into the data voltage Vdata according to the data control signal DCS supplied from the timing controller 200, and supplies the converted data voltage Vdata to the pixel via the data line DL.

In FIG. 21, it is illustrated that one data driver 400 is disposed at one side of the display panel 100. However, the number and a position of the data drivers 200 are not limited thereto.

That is, the data driver 400 may be embodied as a plurality of integrated circuits (ICs) which may be disposed at one side of the display panel 100 and may be separately arranged along the one side.

The power supply 500 generates direct current (DC) power necessary for operating a pixel array of the display panel 100 and the display panel driver using a DC-DC converter. The DC-DC converter may include a charge pump, a regulator, a buck converter, a boost converter, etc. The power supply 500 receives a DC input voltage applied from the host system (not shown) and generates DC voltages such as the gate on voltage VGL and VEL, the gate off voltage VGH and VEH, the high-potential driving voltage EVDD, the low-potential driving voltage EVSS, etc. The gate on voltage VGL and VEL and the gate off voltage VGH and VEH are supplied to the level shifter (not shown) and the gate driver 300. Each of the high-potential driving voltage EVDD and the low-potential driving voltage EVSS is commonly supplied to the pixels.

A first aspect of the present disclosure provides a display device comprising: a display panel including a plurality of pixel circuits; and a gate driver circuit configured to provide an emission signal, a first scan signal, a second scan signal, a third scan signal, and a fourth scan signal to each of the plurality of pixel circuits, wherein when the display device operates in a variable refresh rate (VRR) mode, the display device is configured to adjust a time at and/or a time duration for which the third scan signal is enabled based on an operating frequency in each of a refresh frame and an anode reset frame, wherein the third scan signal is defined as a signal for applying an on-bias stress voltage to a pixel circuit.

In some implementations of the first aspect, the display device is configured to vary a pulse width of the third scan signal based on the operating frequency.

In some implementations of the first aspect, the display device is configured to reduce the pulse width of the third scan signal in proportion to decrease in the operating frequency.

In some implementations of the first aspect, the display device is configured to shift a toggle timing of the third scan signal based on the operating frequency.

In some implementations of the first aspect, flicker characteristic based on the toggle timing of the third scan signal at each of the operating frequencies is preset in a lookup table of the display device.

In some implementations of the first aspect, when a DBV (Display Bright Value) is changed, the display device is configured to adjust the time at or the time duration for which the third scan signal is enabled based on a luminance band including the DBV in each of the refresh frame and the anode reset frame.

In some implementations of the first aspect, the display device is configured to shift a toggle timing of the third scan signal based on the luminance band.

In some implementations of the first aspect, the display device is configured to shift the toggle timing of the third scan signal to be delayed in proportion to increase in the luminance band.

In some implementations of the first aspect, the display device is configured to vary a pulse width of the third scan signal based on the luminance band.

In some implementations of the first aspect, flicker characteristics based on the pulse width of the third scan signal in each of the luminance bands are preset in a lookup table of the display device.

A second aspect of the present disclosure provides a display device comprising: a pixel circuit, wherein the pixel circuit includes: a light-emitting element configured to emit light based on a driving current; a driving transistor configured to control the driving current and including a gate electrode, a source electrode, and a drain electrode; a storage capacitor disposed between and connected to a power supply voltage and the gate electrode; a first transistor configured to connect the gate electrode and the drain electrode to each other in response to a first scan signal; a second transistor configured to apply a data voltage to the source electrode in response to a second scan signal; and a stress transistor configured to apply an on-bias stress voltage to the source electrode in response to a third scan signal, wherein when the display device operates in a VRR mode, the display device is configured to adjust a variation in a pulse width of the third scan signal and/or a shift of a toggle timing of the third scan signal based on an operating frequency in each of a refresh frame and an anode reset frame.

In some implementations of the second aspect, the display device is configured to reduce the pulse width of the third scan signal in proportion to decrease in the operating frequency or delay the toggle timing of the third scan signal in proportion to decrease in the operating frequency.

In some implementations of the second aspect, a delay value of the toggle timing of the third scan signal at each of the operating frequencies is preset in a lookup table of the display device.

In some implementations of the second aspect, when a DBV changes, the display device is configured to adjust the variation in the pulse width of the third scan signal and/or the shift of the toggle timing of the third scan signal based on a luminance band including the DBV in each of the refresh frame and the anode reset frame.

In some implementations of the second aspect, the display device is configured to delay the toggle timing of the third scan signal in proportion to increase in the luminance band or to reduce the pulse width of the third scan signal in proportion to increase in the luminance band.

In some implementations of the second aspect, a variation value of the pulse width of the third scan signal in each of the luminance bands is preset in a lookup table of the display device.

A third aspect of the present disclosure provides a method for operating a display device, wherein the display device includes: a display panel including a plurality of pixel circuits; and a gate driver circuit configured to provide an emission signal, a first scan signal, a second scan signal, a third scan signal, and a fourth scan signal to each of the plurality of pixel circuits, wherein the third scan signal is defined as a signal for applying an on-bias stress voltage to a pixel circuit, wherein the method comprises: when the display device operates in a variable refresh rate (VRR) mode, adjusting a time at and/or a time duration for which the third scan signal is enabled based on an operating frequency in each of a refresh frame and an anode reset frame.

In some implementations of the third aspect, adjusting the time at and/or the time duration for which the third scan signal is enabled includes at least one of: varying a pulse width of the third scan signal based on the operating frequency; or shifting a toggle timing of the third scan signal based on the operating frequency.

In some implementations of the third aspect, the method further comprises: when a DBV changes, adjusting the time at and/or the time duration for which the third scan signal is enabled based on a luminance band including the DBV in each of the refresh frame and the anode reset frame.

In some implementations of the third aspect, adjusting the time at and/or the time duration for which the third scan signal is enabled includes at least one of: shifting a toggle timing of the third scan signal based on the luminance band; or varying a pulse width of the third scan signal based on the luminance band.

According to the aspects and the implementations, the scan timing for applying the stress voltage to the pixel may be adjusted based on the operating frequency. Thus, the flicker phenomenon may be prevented even when the operating frequency is changed during the VRR operation.

Further, the scan timing may be adjusted based on the luminance band. Thus, the flicker may be prevented even when the DBV is changed.

Further, the display device may optimize the flicker characteristics by adjusting the scan timing based on the operating frequency and/or the DBV. Thus, the image quality may be improved.

Although the embodiments of the present disclosure have been described in more detail with reference to the accompanying drawings, the present disclosure is not necessarily limited to these embodiments, and may be modified in a various manner within the scope of the technical spirit of the present disclosure. Accordingly, the embodiments as disclosed in the present disclosure are intended to describe rather than limit the technical idea of the present disclosure, and the scope of the technical idea of the present disclosure is not limited by these embodiments. Therefore, it should be understood that the embodiments described above are not restrictive but illustrative in all respects.

What is claimed is:

1. A display device comprising:

a display panel including a plurality of pixel circuits; and a gate driver circuit configured to provide an emission signal, a first scan signal, a second scan signal, a third scan signal, and a fourth scan signal to each of the plurality of pixel circuits, wherein when the display device operates in a variable refresh rate (VRR) mode, the display device is configured to adjust a time at and/or a time duration for which the third scan signal is enabled based on an operating frequency in each of a refresh frame and an anode reset frame, wherein the third scan signal is defined as a signal for applying an on-bias stress voltage to a pixel circuit, and wherein the display device is configured to reduce the pulse width of the third scan signal in proportion to decrease in the operating frequency.

2. The display device of claim 1, wherein the display device is configured to shift a toggle timing of the third scan signal based on the operating frequency.

3. The display device of claim 2, wherein flicker characteristic based on the toggle timing of the third scan signal at each of the operating frequencies is preset in a lookup table of the display device.

4. The display device of claim 1, wherein when a DBV (Display Bright Value) is changed, the display device is configured to adjust the time at or the time duration for which the third scan signal is enabled based on a luminance band including the DBV in each of the refresh frame and the anode reset frame.

5. The display device of claim 4, wherein the display device is configured to shift a toggle timing of the third scan signal based on the luminance band.

6. The display device of claim 5, wherein the display device is configured to shift the toggle timing of the third scan signal so as to be delayed in proportion to increase in the luminance band.

7. The display device of claim 4, wherein the display device is configured to vary a pulse width of the third scan signal based on the luminance band.

8. The display device of claim 7, wherein flicker characteristics based on the pulse width of the third scan signal in each of the luminance bands are preset in a lookup table of the display device.

9. A display device comprising:

a pixel circuit, wherein the pixel circuit includes:

a light-emitting element configured to emit light based on a driving current;

a driving transistor configured to control the driving current and including a gate electrode, a source electrode, and a drain electrode;

a storage capacitor disposed between and connected to a power supply voltage and the gate electrode;

a first transistor configured to connect the gate electrode and the drain electrode to each other in response to a first scan signal;

a second transistor configured to apply a data voltage to the source electrode in response to a second scan signal; and a stress transistor configured to apply an on-bias stress voltage to the source electrode in response to a third scan signal, wherein when the display device operates in a VRR mode, the display device is configured to adjust a variation in a pulse width of the third scan signal and/or a shift of a toggle timing of the third scan signal based on an operating frequency in each of a refresh frame and an anode reset frame, and wherein the display device is configured to reduce the pulse width of the third scan signal in proportion to decrease in the operating frequency or delay the toggle timing of the third scan signal in proportion to decrease in the operating frequency.

10. The display device of claim 9, wherein a delay value of the toggle timing of the third scan signal at each of the operating frequencies is preset in a lookup table of the display device.

11. The display device of claim 9, wherein when a DBV changes, the display device is configured to adjust the variation in the pulse width of the third scan signal and/or the shift of the toggle timing of the third scan signal based on a luminance band including the DBV in each of the refresh frame and the anode reset frame.

12. The display device of claim 11, wherein the display device is configured to delay the toggle timing of the third scan signal in proportion to increase in the luminance band or to reduce the pulse width of the third scan signal in proportion to increase in the luminance band.

13. The display device of claim 11, wherein a variation value of the pulse width of the third scan signal in each of the luminance bands is preset in a lookup table of the display device.

14. A method for operating a display device, wherein the display device includes:

a display panel including a plurality of pixel circuits; and a gate driver circuit configured to provide an emission signal, a first scan signal, a second scan signal, a third scan signal, and a fourth scan signal to each of the plurality of pixel circuits, wherein the third scan signal is defined as a signal for applying an on-bias stress voltage to a pixel circuit, wherein the method comprises:

when the display device operates in a variable refresh rate (VRR) mode, adjusting a time at and/or a time duration for which the third scan signal is enabled based on an operating frequency in each of a refresh frame and an anode reset frame, and when a DBV changes, adjusting the time at and/or the time duration for which the third scan signal is enabled based on a luminance band including the DBV in each of the refresh frame and the anode reset frame.

15. The method of claim 14, wherein adjusting the time at and/or the time duration for which the third scan signal is enabled includes at least one of:

varying a pulse width of the third scan signal based on the operating frequency; or shifting a toggle timing of the third scan signal based on the operating frequency.

16. The method of claim 14, wherein adjusting the time at and/or the time duration for which the third scan signal is enabled includes at least one of:

shifting a toggle timing of the third scan signal based on the luminance band; or varying a pulse width of the third scan signal based on the luminance band.

17. A display device comprising:

a plurality of pixels, each of which comprises a pixel circuit, wherein the pixel circuit includes:

a light-emitting element configured to emit light;

a driving transistor configured to driving the light-emitting element;

a storage capacitor connected between a power supply voltage and a gate electrode of the driving transistor;

a first transistor, a source electrode and a drain electrode of which are respectively connected to the gate electrode and a drain electrode of the driving transistor, and a first scan signal is supplied to a gate electrode of the first transistor;

a second transistor, a source electrode and a drain electrode of which are connected between a data voltage and the source electrode of the driving transistor, and a second scan signal is supplied to a gate electrode of the second transistor; and a third transistor, a source electrode and a drain electrode of which are connected between an on-bias stress voltage and the source electrode of the driving transistor, and a third scan signal is supplied to a gate electrode of the first transistor, wherein, in a VRR mode, a pulse width and/or a shift of a toggle timing of the third scan signal is adjusted according to an operating frequency in each of a refresh frame and an anode reset frame, and wherein the pulse width of the third scan signal is reduced in proportion to decrease in the operating frequency or delay the toggle timing of the third scan signal in proportion to decrease in the operating frequency.

18. The display device of claim 17, wherein a delay value of the toggle timing of the third scan signal at each of the operating frequencies is preset in a lookup table of the display device.

19. The display device of claim 17, wherein when a DBV changes, the variation in the pulse width and/or the shift of the toggle timing of the third scan signal is adjusted based on a luminance band including the DBV in each of the refresh frame and the anode reset frame.

20. The display device of claim 19, wherein the toggle timing of the third scan signal is delayed in proportion to increase in the luminance band or the pulse width of the third scan signal is reduced in proportion to increase in the luminance band.

21. The display device of claim 19, wherein a variation value of the pulse width of the third scan signal in each of the luminance bands is preset in a lookup table of the display device.

* * * * *